United States Patent [19]
Scalzi et al.

[11] Patent Number: 6,009,261
[45] Date of Patent: Dec. 28, 1999

[54] PREPROCESSING OF STORED TARGET ROUTINES FOR EMULATING INCOMPATIBLE INSTRUCTIONS ON A TARGET PROCESSOR

[75] Inventors: Casper Anthony Scalzi, Poughkeepsie; Eric Mark Schwarz, Gardiner, both of N.Y.; William John Starke, Austin, Tex.; James Robert Urquhart, Fishkill; Douglas Wayne Westcott, Rhinebeck, both of N.Y.

[73] Assignee: International Business Machines Corporation, Armonk, N.Y.

[21] Appl. No.: 08/991,714

[22] Filed: Dec. 16, 1997

[51] Int. Cl.[6] ..................................................... G06F 9/455
[52] U.S. Cl. ................................. 395/500.47; 395/500.48
[58] Field of Search ........................ 257/51; 395/500.25, 395/500.35, 500.34, 500.21, 500.43, 500.47, 500.48, 500.49

[56] References Cited

U.S. PATENT DOCUMENTS

| | | |
|---|---|---|
| 4,587,612 | 5/1986 | Fisk et al. . |
| 4,851,990 | 7/1989 | Johnson et al. . |
| 5,077,657 | 12/1991 | Cooper et al. . |
| 5,081,572 | 1/1992 | Arnold . |
| 5,333,297 | 7/1994 | Lemaire et al. . |
| 5,471,612 | 11/1995 | Schlafly ................................. 707/104 |
| 5,488,729 | 1/1996 | Vegesna et al. . |
| 5,574,927 | 11/1996 | Scantlin ............................ 395/500.44 |
| 5,751,982 | 5/1998 | Morley .................................... 712/209 |
| 5,857,094 | 1/1999 | Nemirovsky ....................... 395/500.49 |
| 5,896,522 | 4/1999 | Ward et al. ........................ 395/500.44 |
| 5,909,567 | 6/1999 | Novak et al. ........................... 712/208 |

OTHER PUBLICATIONS

U.S. application No. 08/864,585, Greenspan et al., filed May 28, 1997.
U.S. application No. 08/864,402, Greenspan et al., filed May 28, 1997.
Annexstein et al., Acheiving Multilanguage Behavior in Bit–Serial SIMD Architectures Via Emulation, Feb. 1990, pp. 186–195.
Hookway, Digital FX!32 Running 32–Bit X86 Applications on Alpha NT Mar. 1997, pp. 37–42.

*Primary Examiner*—Kevin J. Teska
*Assistant Examiner*—Dan Fiul
*Attorney, Agent, or Firm*—Marc A. Ehrlich; Bernard M. Goldman

[57] ABSTRACT

Provides a program translation and execution method which stores target routines (for execution by a target processor) corresponding to incompatible instructions, interruptions and authorizations of an incompatible program written for execution on another computer system built to a computer architecture incompatible with the architecture of the target processor's computer system. The disclosed process allows the target processor to emulate incompatible acts expected in the operation of an incompatible program when the target processor itself is incapable of performing the emulated acts. Each of the instructions, interruptions and authorizations found in the incompatible programs has one or more corresponding target routines, any of which may need to be preprocessed before it can precisely emulate the execution results required by the incompatible architecture. Target routines (corresponding to the incompatible instruction instances in an incompatible program being emulated) are accessed, patched where necessary, and executed by a target processor to enable the target processor to precisely obtain the execution results of the emulated incompatible program. Before preprocessing, each target routine may not be able to provide identical execution results as required by the incompatible architecture, and the preprocessing may patch one or more of its target instructions to enable the target routine to perform the identical emulation execution of the corresponding incompatible instruction. The patching and other modifications to a target routine are done by one or more preprocessing instructions stored in the target routine.

47 Claims, 13 Drawing Sheets

LOAD FOR PATCH

| OPCODE | |
|---|---|

FIG.6

PATCH AND EXECUTE

| OPCODE | TARGET BIT LOCATOR | INCOMPATIBLE BIT LOCATOR | LENGTH |
|---|---|---|---|
| | 710 | 711 | 712 |

FIG.7

PATCH

| OPCODE | TARGET BIT LOCATOR | INCOMPATIBLE BIT LOCATOR | LENGTH |
|---|---|---|---|
| | 810 | 811 | 812 |

FIG.8

END ROUTINE

| OPCODE | |
|---|---|

FIG.16

IFETCH RESET

| OPCODE | GPR CONTAINING NEW INSTR ADDR | |
|---|---|---|

SET AUTHORITY

| OPCODE | GPR CONTAINING NEW AUTH INFO | INST LENGTH | |
|---|---|---|---|

INCOMPATIBLE INSTRUCTION: L R,D(X,B)

LOAD FOR PATCH

ADD

PATCH                              UPDATE ADD WITH X

PATCH AND EXECUTE                  UPDATE ADD WITH B AND ADD X + B

RLDIMI                             UPDATE DEVAR WITH X+B

LOAD FOR PATCH

LWZ

PATCH                              UPDATE LWZ WITH D

PATCH AND EXECUTE                  UPDATE LWZ WITH R AND LOAD R

END ROUTINE

RISC INSTRUCTIONS:

ADD=ADD INSTRUCTION

RLDIMI=ROTATE LEFT DOUBLE IMMEDIATE THEN MASK INSERT

LWZ=LOAD WORD AND ZERO

FIG.19

INCOMPATIBLE INSTRUCTION: L R,D(0,B)

RLDIMI                      UPDATE DEVAR WITH B

LOAD FOR PATCH

LWZ

PATCH                        UPDATE LWZ WITH D

PATCH AND EXECUTE        UPDATE LWZ WITH R AND LOAD R

END ROUTINE

RISC INSTRUCTIONS:

RLDIMI=ROTATE LEFT DOUBLE IMMEDIATE THEN MASK INSERT

LWZ=LOAD WORD AND ZERO

FIG.20

PREPROCESSING OF STORED TARGET ROUTINES FOR EMULATING INCOMPATIBLE INSTRUCTIONS ON A TARGET PROCESSOR

INTRODUCTION

The subject invention generally relates to enabling programs written for execution on a computer system built to one type of computer architecture to be executed on a target computer system built to a target architecture different from the architecture of the emulated computer system. More specifically, the subject invention provides methods and means for a target computer system to emulate acts expected in the operation of an emulated program when the target computer system is itself incapable of performing the emulated acts.

INCORPORATION BY REFERENCE

This application incorporates by reference the entire content of each of the two following applications:

1) U.S. Pat. No. 5,560,013 (PO994067) entitled "Method of using a Target Processor to Execute Programs of a Source Architecture that uses Multiple Address Spaces", filed on Sep. 24, 1996 by C. A. Scalzi and W. J. Starke.
2) U.S. Pat. No. 5,577,231 (PO994041) entitled "Storage Access Authorization Controls in a Computer System Using Dynamic Address Translation of Large Addresses", filed on Nov. 19, 1996 by C. A. Scalzi and W. J. Starke.

The above incorporated patents teach program emulation methods and mechanisms, some of which are used in the subject invention. The U.S. Pat. No. 5,560,013 and U.S. Pat. No. 5,577,231 patent teach emulation methods using a target architecture having a much larger virtual address size than found in the emulated (source) architecture, and they trade virtual address space in the target system for emulated operational characteristics in the emulated architecture which may be alien to, and unrecognizable by, the target architecture, such as authority controls found only in the emulated architecture and not found in the target architecture. The embodiments in these incorporated patents emulate the complex IBM S/390 architecture, which contains elaborate storage access authorization mechanisms, for allowing an operating system to provide a programming environment which enforces strong integrity characteristics with regard to programs, and allows establishment of restricted data access domains. The more complex of such mechanisms generally have no counterpart in simpler target processor architectures, such as the Power PC and Intel CISC architectures. To provide the total operational execution environment of a complex incompatible architecture, the embodiments in these patents teach how the S/390 access authorization mechanisms may be emulated in a target machine not having these mechanisms. In more detail, these S/390 access authorization mechanisms include real storage access keys, storage access authority granted to programs, storage fetch-only authority, storage write authority, and address space access authority. These mechanisms must be properly emulated in a target processor to support a real S/390 operating scenario capable of executing S/390 application programs, in which the scenario includes OS/390 software, middleware programming, and the application programming.

BACKGROUND

U.S. Pat. No. 4,587,612 (Fisk, et al.) describes a system for accelerated instruction mapping of a program in the architecture of one system, called the source, to instructions of a different system, called the target. The translation is done by an independent processor provided for the purpose and executing concurrently, and in tandem with, the target processor. The processor doing the translation is called an Emulation Assist Processor (EAP). That patent teaches the substitution of specific register values, and immediate displacement values, from source machine instruction into target machine instructions which, either singly or as a sequence of more than one, perform the function of the source machine. The technique described cannot be used to provide a total operational S/390 program execution environment. It does not describe a method to access emulated source main storage. Complex source machine architecture, e.g. S/390, often contains elaborate storage access authorization mechanisms for allowing an operating system to provide a programming environment which has strong integrity characteristics with regard to other programs, and allowing establishment of restricted data access domains. Such mechanisms generally have no counterpart in simpler target processors. To provide the total operational execution environment of a complex source machine, such access authorization mechanisms must be emulated in the target machine.

Examples of such architected mechanisms in a S/390 embodiment are real storage access keys, storage access authority granted to programs, storage fetch-only authority, storage write authority, and address space access authority. These mechanisms must be properly emulated in a target processor to support a real S/390 operating scenario including OS/390 software, middleware programming, and applications programming.

U.S. Pat. No. 5,577,231 (Scalzi and Starke) describes an efficient method of providing such access authorization mechanisms for a source machine with, for example, 31-bit addressing architecture on a simpler target machine with a larger size addressing architecture, e.g. one with 64-bit addresses. The additional address bits provide the capability of emulating S/390 access authority mechanisms as part of the target machine virtual address. The target machine instructions executed to provide the function of source machine instructions do not require 64 bits in order to access the emulated virtual storage or main storage of the source machine. For example, in S/390 source machines, only 31 bits of the target machine address are required as an offset or address into the emulated S/390 absolute main storage, and the basic addresses within an address space are only 31 bits. Excess high-order bits are used instead to emulate access under the various states of the source machine storage access controls. The source address, extended on the left by an access authority state, is called a target processor exploded virtual address. The high-order bits of the exploded virtual address represent the access authority of the source program making the storage request. On first reference to a particular location under a specific setting of the source access controls, a target page fault will occur. The emulator kernel, either a program or microcode, on the target machine will determine the validity of the access in resolving the page fault. If the access is invalid, the architected response for the invalid condition encountered is reflected to the appropriate source program as specified in the source machine architecture. If the access is valid, a Page Table Entry (PTE) is established for the exploded address so that the target page frame emulating the accessed source storage page may be accessed at full target machine processor speed without further intervention, as long as the PTE remains established for that target virtual page. The target processor exploded virtual address in the PTE represents two things in composite: the source machine storage address (either virtual or real), and the storage access authority under which the access was made and found valid. The instruction that caused the page fault is re-executed. Its and future accesses to the same source location under the same access authority occur at full target machine performance through the established PTE. If the same source storage location is then accessed from a different source storage access authority state, the target machine will use a different target virtual address to access the location. The exploded address used will be different than on the earlier access. In a S/390 embodiment, the low-order 31 bits will be the same as before, but the high-order bits will reflect a different source access authority state; for example, a different PSW storage access key. The target machine will not resolve the second target virtual address used with the PTE established for the first access, since the target processor address is different. The first time this second address is used, a page fault occurs, and the source access with the new authority state can be validated by the emulator kernel. If that access is also valid, a second, different PTE is established for the access from the second authority state.

U.S. Pat. No. 5,560,013 (Scalzi and Starke) describes an efficient programming method to apply the inventive concepts of U.S. Pat. No. 5,577,231 in the emulation of a complete program operational environment of a computing system with complex access authority mechanisms in its architecture; for example, to emulate a total S/390 program operating environment, including an operating system, middleware, and application programs. The machine language instructions of an alien source computer are translated, as encountered, in the emulated execution of a source computer program on a different target computer. A translation exists for each possible source processor instruction type, and consists of one or more target machine instructions that together will provide the function of the source machine instruction. As each source instruction is encountered, the target translation is accessed, and the target instructions of the translation are modified so that they are made to reflect the specifics of the particular instance of the source instruction, e.g. registers, addresses, displacements, etc. After this modification, the instructions of the translation are saved in a target storage area so that the instruction translation is not required on each execution of the same source instruction during the complete source program emulated execution. As long as the translation remains valid, the existing translation can be executed directly in place of the source instruction. A directory is maintained with an entry for each possible source machine instruction location. This directory indicates whether or not a valid translation already exists for each possible instruction instance. To execute a source instruction during emulated execution of the source program, a branch is taken to the directory entry for the source instruction. If a translation already exists, the directory entry contains a branch instruction to it. Otherwise, the directory entry branches to the instruction translation routine to create the necessary target translation for the source instruction.

SUMMARY OF THE INVENTION

The subject invention provides a program translation and execution system which allows the processor to execute an incompatible program coded to a different computer architecture. The design allows an emulation that avoids the large target storage overhead of the solution provided by U.S. Pat. No. 5,560,013. By doing the instruction translation in a dynamic manner each time an incompatible instruction is encountered, it is unnecessary to save the translations for future use, saving the storage required to preserve these in target storage. The invention provides new functions in emulation mode that are used to personalize target instructions with the characteristics of the incompatible instruction they are to emulate. Also, a register is allocated to hold the incompatible instruction and be an operand location for these new instructions. This allows a standard microprocessor to be used to perform target machine instructions that provide the same results as the incompatible instructions being executed by this emulation technique. Preprocessing is performed in emulation mode to interpret the incompatible instruction to be executed and to select the proper target translation routine to perform its function. This preprocessing can be provided by means of a hardware preprocessor, or be implemented in microcode, or simply be performed by a program executing on the target processor. In the embodiment shown herein, it is a program.

In the emulation operating mode the target instructions to be executed are determined by the preprocessing function which interprets each incompatible instruction to calculate which routine of target instructions must be executed next to continue execution of the incompatible program. In emulation mode, specialized functions are provided to manage and control the storage access authority of the program being emulated, and to reflect specifications of the incompatible instructions into target instructions performing their emulation. In the embodiment shown here, these specialized functions are called instructions, since that is one possible option for the implementation. An emulator, either implemented in microcode or as a program executing on the processor, maps unique incompatible architecture facilities to target machine facilities that are accessed by the target instructions in performing the emulation. The emulator also processes target machine interruptions which signal conditions that require it to validate and control the incompatible authority state and manage the incompatible instruction control flow changes. The target instructions of an incompatible instruction translation routine change the incompatible authority state as required by the incompatible instruction being emulated. They also modify the incompatible instruction address register, or instruction counter, when there is a change in the sequential execution of incompatible instructions.

The target instructions of a translation routine manage the unique architecture facilities of the incompatible program such as general purpose registers, control registers, instruction condition codes, program status words, etc. These are allocated to target machine registers or to target storage locations as appropriate, and processed in their mapped state by the target instructions of the translation routines.

The target instructions also perform any special processes of the incompatible architecture such as address arithmetic, or providing special incompatible instruction condition code indications.

In the microprocessor, the registers are larger than required by the storage addressing of the incompatible program. This allows the registers actually used to address the emulated incompatible storage also to reflect the current authority state of the incompatible program, implementing what is taught in U.S. Pat. No. 5,577,231. The target instructions of each incompatible instruction translation, in cooperation with the emulator, manage the high-order portion of registers used to access incompatible storage so as to reflect the current authority state of the incompatible program for each access being made. Target machine page faults caused by target instructions in translation routines signal the emulator to validate the accesses to incompatible storage, using the emulated facilities of the incompatible architecture. These facilities are maintained by the target instructions of translation routines emulating incompatible instructions which change those facilities for the incompatible program.

The subject invention described here uses an emulation preprocessing function, which decodes the incompatible instructions and, for each, determines the location of a target processor translation template routine that performs the function of the incompatible instruction. A template routine is executed by the processor when the incompatible instruction is reached in the incompatible program instruction execution stream, as indicated by the address in the emulated incompatible instruction address register, or instruction counter.

Also, the particular specifications of each incompatible instruction are extracted from the incompatible instruction, e.g. register numbers specified, dynamically, each time an incompatible instruction is to be executed and used in target instructions of the template routine. It is not necessary to save previous translations to obtain good performance in the emulated execution. The large amount of target storage required to save the existing translations for future execution and for the incompatible instruction directory is saved by the dynamic translation of incompatible instructions as they are encountered during emulated execution.

The invention uses the methods of U.S. Pat. No. 5,577,231 to emulate incompatible machine access authority states in the emulation of incompatible machine program execution on a simpler execution target processor that does not contain hardware equivalents for the more complex incompatible authority mechanisms assumed and used by the incompatible programs.

The target processor provides and uses larger virtual addresses for its own instruction execution than are required by the incompatible instructions which must be performed. The high-order portion of each target machine virtual storage address which accesses incompatible storage is used to indicate the current state of incompatible access authority enablement, thus differentiating the different incompatible authority states from each other in target machine emulation of incompatible storage accesses during incompatible program execution.

The emulator mode facilities of the processor provide six new instructions that are found in the target instruction templates for incompatible instructions to be emulated. These instructions direct and control the emulator facilities as required in the performance of the source-equivalent target instructions. The Load for Patch, Patch, and Patch and Execute instructions are used to modify the instructions of a template in order to reflect the specifics of the incompatible instruction, such as register numbers or displacement amounts.

The End Routine instruction marks the end of a template and signals that a new incompatible instruction must be accessed and interpreted. Control is returned to the preprocessing to perform the access and interpretation, and the transfer to the translation template routine for the next incompatible instruction.

The Ifetch Reset instruction is executed in a template to signal that, as a result of executing the incompatible instruction emulated by the target instruction template routine, the content of the incompatible instruction counter, register 204, is to change. That is, the incompatible program is not to execute the next sequential instruction. Instead, a new value is placed into the emulated incompatible instruction address register to redirect the incompatible program's execution path. Control then passes to the preprocessing function. The preprocessing accesses the address in the incompatible instruction address register and uses it to fetch the next incompatible instruction, and then interprets the instruction, following the flow of the incompatible program as it develops.

The Set Authority instruction is executed in a template when, under the incompatible architecture rules, there has been a change to the storage authority of the incompatible program as a result of executing the incompatible instruction being emulated by the target template routine. Bits representing the new authority state are loaded into the high-order portion of the target registers used to access the incompatible instructions and the data those instructions access in the emulated incompatible storage. This causes all future accesses to incompatible storage to occur from the new access authority state, as represented by the high-order bits in the target virtual addresses actually used by the target instructions of the template routines to make the accesses.

Any of the six special emulation instructions may be implemented as microcoded instructions. Other implementations may provide them as macro-instructions and have them replaced during compilation by in-line code to perform their functions in the appropriate target translation routines. Alternatively, they can be compiled as program calls to routines in the emulator provided to perform these functions when called.

In brief, the preprocessing accesses the incompatible instructions, decodes each and determines the address of the target instruction template routine which emulates the incompatible instruction. It passes the particulars of the incompatible instruction instance to the processor in a incompatible instruction register, and transfers control to the first instruction of the translation routine for the incompatible instruction. The processor, in emulation mode, accesses and executes each instruction in the specified translation template routine in order. The template routine contains the target instructions whose execution emulates the incompatible instruction. Six special instructions are provided in emulation mode which are used in the template routines to modify specified target instructions in the template so that they reflect parameters of the incompatible instruction instance as actually coded, to signal the preprocessing of changes in its sequential execution flow, to establish a new authority state for accesses to incompatible storage for incompatible instructions or the data they process, and to signal the end of the target translation routine for the current incompatible instruction.

By use of the six special instructions, the template routines can fully emulate the incompatible instructions, without special target hardware in the processor to emulate incompatible instruction characteristics. The preprocessing function must be able to decode the format of the incompatible instructions enough to select a template routine. Different than U.S. Pat. No. 4,587,612 it need not include generation of the target instructions required to execute incompatible instructions and their modification to reflect the incompatible instruction instance. Instead, that function is provided by the programming of the template routines for the incompatible instruction executions, which use the special instructions, as needed, to direct normal execution of instructions by the processor at its rated performance.

In cases where the fields in incompatible instructions may be specified as null, separate template routines may be designed that take advantage of the null specification. If an incompatible field need not be handled, the target template routine can contain fewer target instructions to be executed. For example, in S/390 certain instructions allow specification of two registers, base and index, and an immediate displacement field, the contents of which take part in operand effective address calculation. Frequently, only one register is actually specified, and often a zero displacement is coded.

The preprocessing function is designed to recognize such null specifications. Instead of just using the incompatible instruction opcode as the table lookup parameter to find the proper translation template routine address for the incompatible instruction, it extends the lookup field to include other bits, each representing an incompatible instruction field which is frequently coded as null. Each bit indicates whether the field was null or non-null.

Thus, the null cases can be distinguished from the non-null ones in the table lookup to find the address of the target routine to emulate the incompatible instruction. This yields faster emulation of incompatible instructions, some of whose fields are frequently coded with null values, by providing separate translation template routines for them when null values are found. These templates for incompatible instructions with null field specifications contain fewer target instructions to be executed, providing faster emulation of those incompatible instructions.

The invention efficiently adapts to emulate a system with an evolving architecture, such as S/390, in which new instructions are periodically added. For the described system, such new incompatible instructions can be handled by new incompatible instruction translation template routines. There is no hardware impact to handle the new incompatible instructions. Target instructions requiring no modification are executed directly from the template, requiring no control information to be examined in order to direct their handling. Also, since machine characteristics are contained in the target translation routines and the preprocessing function, the invention can be applied to the emulation of many incompatible architectures without affecting the target processor hardware.

All accesses to the target system storage in behalf of the incompatible program are made with target virtual addresses larger than the incompatible program addresses they emulate, with the high-order bits representing the particular access authority state of the incompatible program at the time of access. This is done for the accesses of the incompatible instructions by the preprocessing code, and for data accesses to incompatible storage made by target instructions emulating data accesses by the incompatible instructions.

BRIEF DESCRIPTION OF DRAWINGS

The subject matter which is regarded as the invention is particularly pointed out and distinctly claimed in the claims at the conclusion of the specification. The foregoing and other objects, features and advantages of the invention will be apparent from the following detailed description taken in conjunction with the accompanying drawings which are:

FIG. 6 depicts the format of the Load For Patch instruction.

FIG. 7 depicts the format of Patch and Execute instruction.

FIG. 8 depicts the format of the Patch instruction.

FIG. 16 depicts the format of the End Routine instruction.

FIG. 17 depicts the format of the Ifetch Reset instruction.

FIG. 18 depicts the format of the Set Authority instruction.

FIG. 19 depicts the translation template for an incompatible load instruction which specifies a base register, an index register and a displacement.

FIG. 20 depicts the translation template for an incompatible load instruction which specifies a base register and a displacement, but no index register.

DESCRIPTION OF THE DETAILED EMBODIMENT

Figure 1:
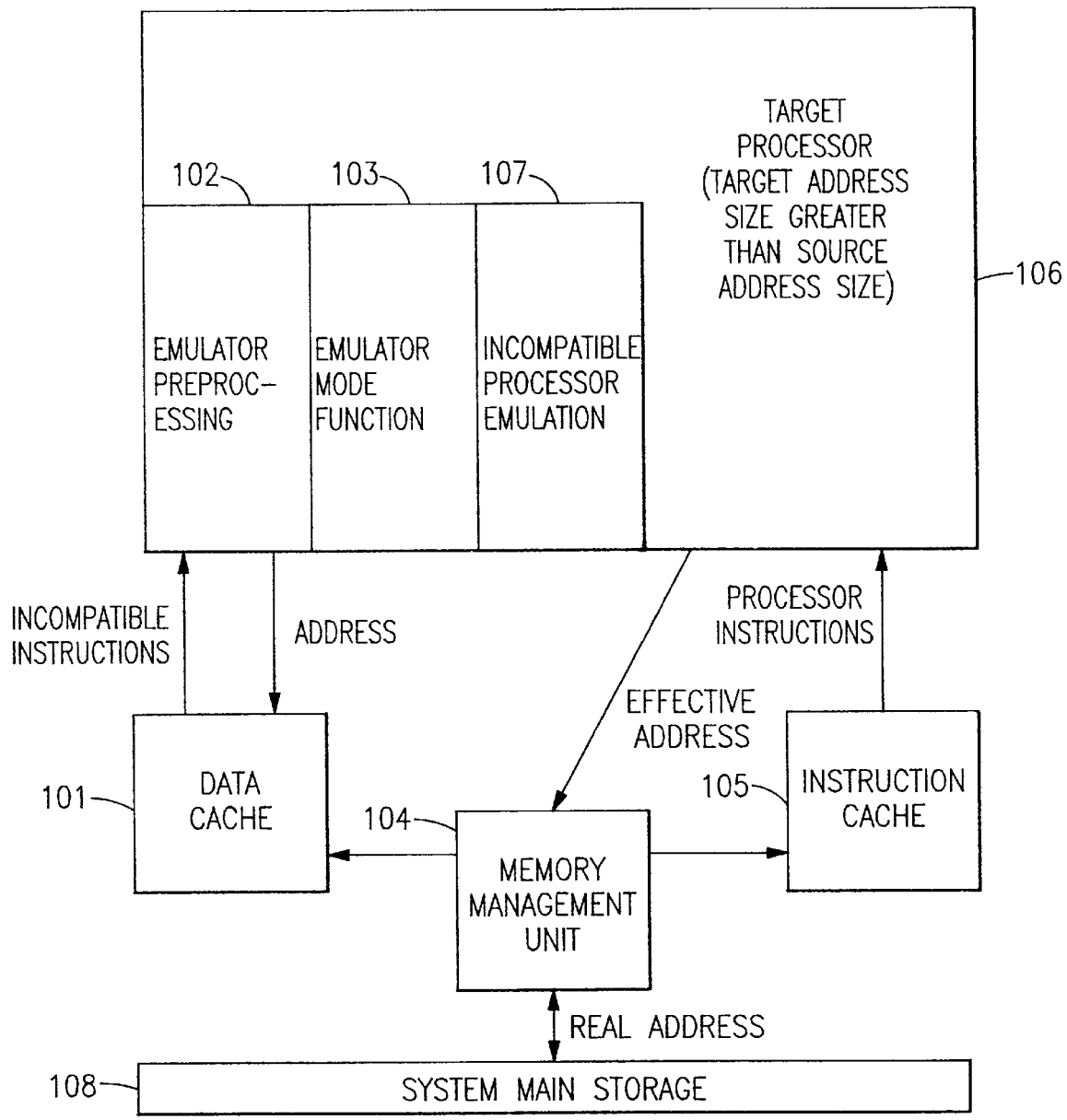
FIG. 1 illustrates the main system elements in which the invention operates.

Elements of the invention are depicted in FIG. 1 in a target processor 106, which may be a standard microprocessor using RISC or CISC architecture, for example. The target processor also contains preprocessing function 102, which controls an incompatible instruction address register, accesses the incompatible instruction next to be executed, interprets its opcode, tests selected fields in the incompatible instruction for null specification, prepares a table lookup value from the incompatible instruction opcode extended by null field specification summary bits, and uses the table lookup value to find the address in the target memory of a corresponding target routine that performs the function of the incompatible incompatible instruction to be executed. An emulator mode function 103 processes the target instructions of the selected target translation routine to reflect specifics of the incompatible instruction instance to be emulated by moving any necessary fields from the incompatible instruction to appropriate target instruction(s) in the target routine before each of its target instructions is executed. This process of modifying the target instructions in a target routine is herein termed "patching" and is performed by three patching instructions, which may be hardware-implemented, or provided in microcode-implemented, or program-implemented in various types of embodiments available for this invention. The preferred embodiment described in detail herein uses a microcoded implementation in the target processor. The microcode is software which is protected from being changed by user software executing in the target processor.

Incompatible processor emulation 107 executes each target instruction in the target routine after any patching has been done to the target instruction, so that when execution of the target routine is completed it obtains the same effect as the execution of the incompatible instruction would obtain if executed on a machine built to the architecture of the incompatible program being emulated. Incompatible processor emulation 107 includes of a software which manages the mapping of incompatible architecture facilities to facilities of the target machine for purposes of the emulation, and handles page fault processing to validate incompatible storage access authority states and establish these in the target system for efficient future accesses without such validation.

The preprocessor 107 accesses incompatible instructions as data from target system main storage 108 through a data cache 101 which is shared with the target processor 106. The target processor 106 accesses its instructions for execution from an instruction cache 105. Memory management unit 104 handles cache misses and cache castouts (stores) to system main storage 108.

Figure 2:
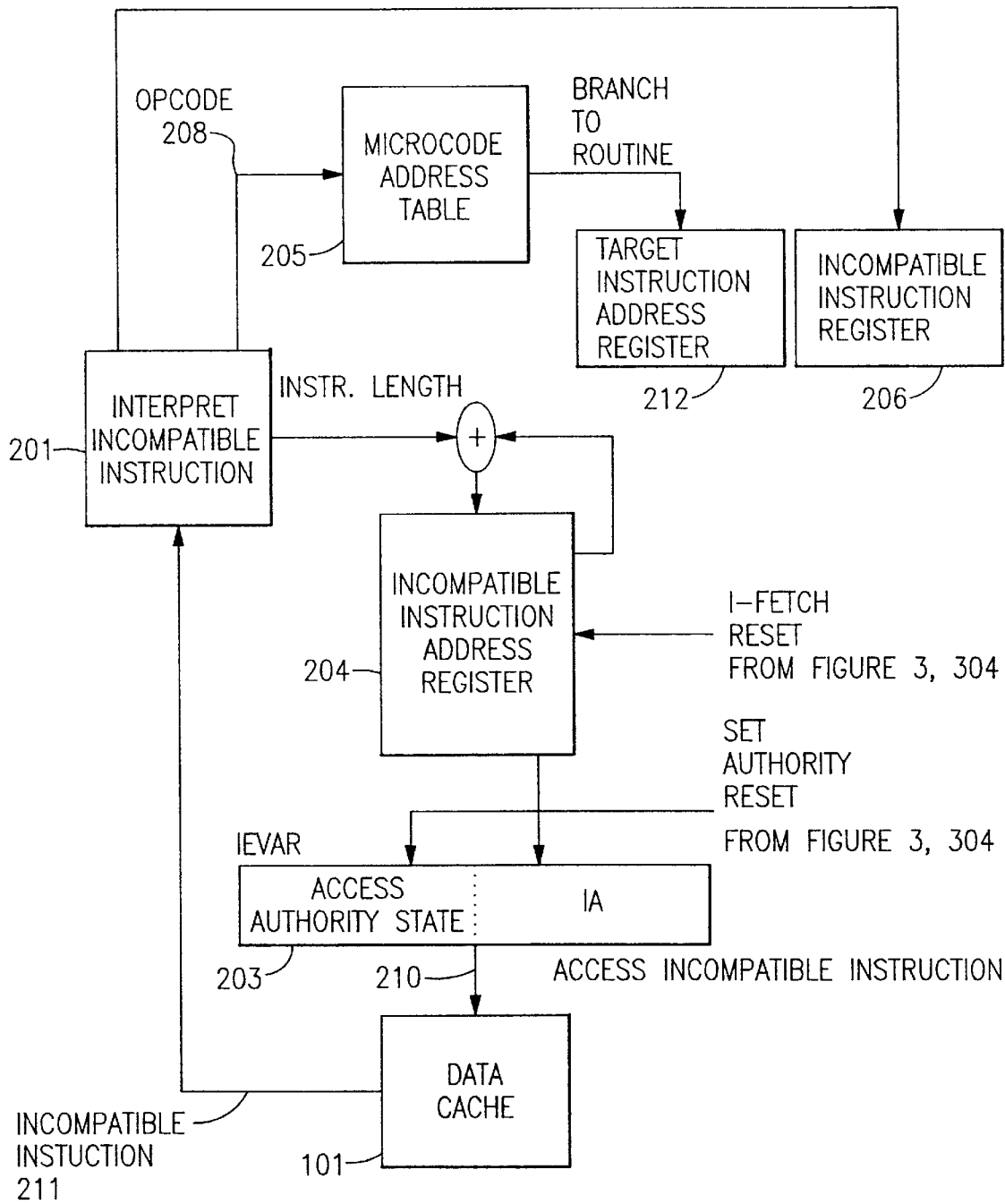
FIG. 2 depicts the elements of the logic of the emulation preprocessing of an incompatible program.

FIG. 2 shows the operation of the incompatible instruction preprocessing function 102. It contains an incompatible instruction address counter, register 204, used to access the incompatible instructions from the portion of target system storage assigned as incompatible storage area 401 (shown in FIG. 4). Incompatible instructions are fetched from there by the preprocessing function 102 for analysis of the operation codes and, possibly, other fields as well. In emulation mode, each incompatible instruction instance is translated to a set of equivalent target instructions in a corresponding target translation routine for execution in the target processor. There is at least one target processor translation routine corresponding to each incompatible instruction type, which routine must be modified to reflect specifications of the incompatible instruction instance.

For example, in emulating S/390 incompatible instructions (which are herein presumed to be incompatible with the target processor), the register numbers and displacement amounts specified in the S/390 instruction must be reflected in the appropriate target instructions in the corresponding target routine which emulates the S/390 instruction. For this reason, a target routine is herein called a "translation template". The preprocessing function 107 (shown in detail in FIG. 2) determines the address in the target processor of the corresponding translation template for each incompatible instruction instance encountered during the emulated execution of the incompatible program, and this address branches the target machine execution to the first instruction of the selected routine.

In complex incompatible machine instructions (exemplified by the S/390 architecture), specifications in addition to the operation code may be used to determine what template routine is to be executed, such that an incompatible instruction type may have more than one corresponding template routine (hereafter called a "template"). The template is selected in table 205 for execution, and its selection is determined from the overall specifications of the incompatible instruction instance. The parameters in each incompatible instruction used for selection are preplanned and precoded, and used by preprocessing 102 to determine which translation template is to be used for each particular incompatible instruction instance. For example, certain incompatible instruction fields may be tested for a null specification in the instance to be emulated, and a different corresponding routine may be selected when a tested field is null in the current instance. The advantage of null field testing is that the corresponding template may have fewer target instructions to be executed in emulating that incompatible instruction instance, when compared to using a corresponding template which supports all available values for that field. This advantage becomes important when the null field condition is frequently used in the incompatible instructions being emulated.

To find an associated target processor translation template routine, a table lookup operation in table 205 is performed using the incompatible instruction operation code plus any other qualifier(s) chosen for testing for this purpose in the incompatible instruction instance, that together uniquely identify the required translation template routine to use in order to perform the currently executing instance of the incompatible instruction. This lookup selects a translation template that provides a specific target machine equivalent routine to perform the exact same functions as a native processor would for the given incompatible instruction. The target processor translation templates for all incompatible instructions are kept in area 407 in protected emulator storage (see FIG. 4).

Figure 3:
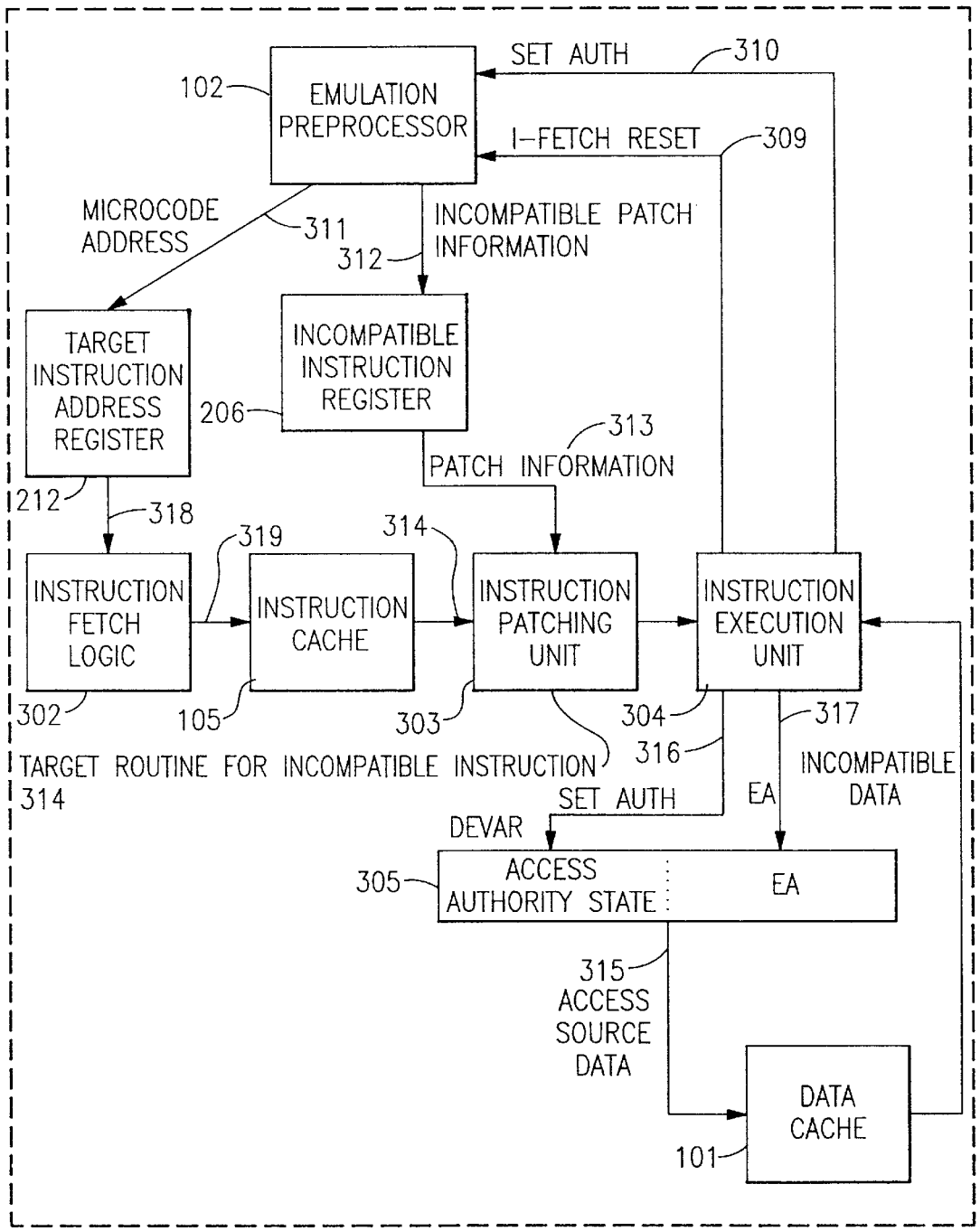
FIG. 3 depicts the elements of processor execution in emulation mode.

In FIG. 3, the preprocessor 102 loads the incompatible instruction to be executed into the incompatible instruction register 206 where it is available as a source of patch information for an emulation mode patching operation. The particulars from the incompatible instruction instance are called patch information because they are used to modify or "patch" the target instructions of the translation routine which will perform the functions of the incompatible instruction. The patch information may be the incompatible instruction text itself as depicted in this embodiment; however, other variations using information extracted from the instruction instance may also be used.

When the incompatible program control flow changes from its normal execution flow due to a branch or an interruption, the emulated incompatible instruction address register is loaded with the new location for target instruction execution to reflect the change, and this affects the instruction preprocessing to be performed next.

In FIG. 2 the incompatible instruction address of the next incompatible instruction to be executed is read out from the instruction counter, register 204, and the incompatible instruction fetched from incompatible storage area 401 in the target system storage. The access is performed through the Instruction Exploded Virtual Address Register IEVAR 203. The high-order part of the IEVAR contains a value representing the current state of the program authority for accesses to incompatible storage for instruction accesses. The incompatible instruction is interpreted based on the incompatible architecture instruction format. The opcode obtained is used, possibly in combination with bits representing other aspects of the coded incompatible instruction instance, to form a search parameter for a table lookup operation in the Microcode Address Table 205 to obtain the address of the corresponding target processor translation routine that provides the same function as the incompatible instruction to be emulated.

This process is performed by incompatible instruction interpreter 201. The length of the incompatible instruction is used to update the incompatible instruction address register 204 for accessing the next incompatible instruction. The specified particulars of the incompatible instruction instance are provided by the interpreter for later patching operations by its loading the current incompatible instruction (being emulated) into a incompatible instruction register 206. The template address obtained from the Microcode Address Table is used to branch to the corresponding target routine for execution, and the tempate address is placed in target instruction address register 212.

When the emulation function 107 (see FIG. 1) in the target processor determines a non-sequentiality in incompatible instruction flow, it resets the incompatible instruction address register 204 with the new instruction counter value. When the execution of the incompatible program causes a change in the access authority for instruction access by the incompatible program, an Instruction Exploded Virtual Address Register (IEVAR) 203 is set by the emulator operation, which changes the high-order address part of IEVAR 203. Storage accesses in the target storage for incompatible instructions are performed through use of IEVAR 203, in which the current access authority state of the incompatible program for instruction fetching is reflected in the high-order bits of the exploded target virtual address used to access the incompatible instructions.

FIG. 3 depicts the emulator functions 103 performed in the target processor. The preprocessor function 102 uses transfer path 312 to transfer the selected patch information to the incompatible instruction register 206, which receives the incompatible instruction and provides the necessary patch information to be used to modify target instructions in the corresponding template routine which is to emulate the incompatible instruction The target instruction address register 212 determines the target processor's execution path. Then the preprocessor 102 branches to the selected target translation routine which is to perform the functions of the incompatible instruction for each incompatible instruction, in the order in which the incompatible program execution dictates that its instructions should be executed. The instruction fetch logic 302 of the target processor reads the content of the target instruction address register 212 on line 318 and requests the instruction from storage on line 319.

Figure 5:
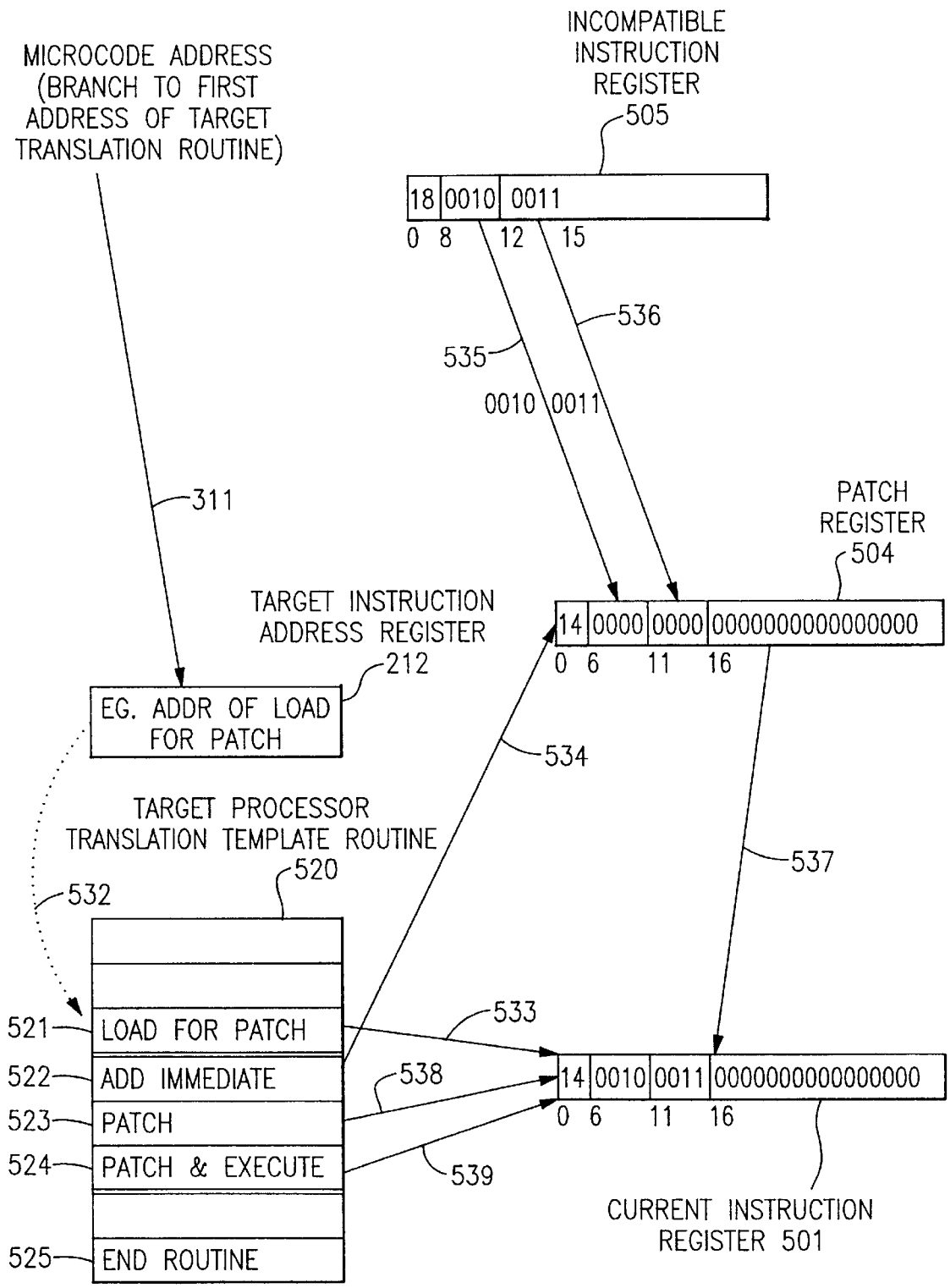
FIG. 5 depicts the operation of the Patch Unit in emulation mode operation of the processor.

The instruction cache 105 supplies the required instruction on line 314. In box 303 the target instructions of the routine are then each modified, or patched, as necessary for the incompatible instruction type, to reflect the particulars of the incompatible instruction instance they are to perform, e.g. particular registers or displacements specified. Detailed operations of this process are illustrated in FIG. 5. The target instructions are then executed by the processor instruction execution unit 304.

If any of the target instructions require no patching, they pass through directly to the instruction execution unit 304 for execution without a patching step in 303. Where the execution results in a change in the sequential flow of the incompatible program, the incompatible instruction address register 204 is changed by instructions in the translation routine in order to redirect the operations of the preprocessing function, as depicted by line 309. Where the execution results in a change to the storage access authority of the incompatible program, the new authority is set into the high-order part of the IEVAR 203 by instructions of the translation routine, depicted by line 310, thus affecting accesses for incompatible instructions made by the preprocessor.

During target instruction execution emulating incompatible instructions, accesses to an incompatible instruction storage data area in the target system storage for data occur by means of the Data Exploded Virtual Address Register (DEVAR) 305. The incompatible effective address (EA) is sent to the low-order part of DEVAR 305, as illustrated by line 317 in FIG. 3. The high-order part of DEVAR 305, which normally remains unchanged for thousands of incompatible instructions at a time, reflects the current data access authority of the incompatible program under incompatible architecture. Thus, as explained earlier for incompatible instruction addresses (used to access instructions in an emulated incompatible storage area 401 in the target system storage), the high-order part of the target address represents the incompatible machine access authority state (not supported in the target processor hardware) of the program making the data access. When the access authority of the incompatible program changes as a result of its own execution, instructions of the translation routine for the incompatible machine authority-changing instruction will change the high-order part of the DEVAR 305.

A simple example for a S/390 incompatible program would be an access of data in another address space which would require part of the high-order part of the target exploded address to be changed to reflect the new virtual address space of the reference, forcing the incompatible program's authority to access the address space to be validated, if it had not yet been checked. The first access to an incompatible storage location under a new incompatible program authority state will result in a target page-fault, causing the microcoded or programmed emulator to check the validity of access and, when valid, establish a target page-table entry (PTE) for the full target location address, including the incompatible access state. All following accesses to the same page will occur at full target processor speed through the established PTE, accessed from the data cache 101. However, a reference to the same page under a different authority state will cause a target page-fault, allowing the emulator program to check the validity of the reference under the new authority state. Should the new reference be valid, another, different, target processor PTE is established for the second target virtual address which accesses the same emulated location. Of course, both PTE's resolve the different target virtual addresses to the same target real location, that of the accessed location. When the emulated execution of the incompatible instruction results in a change in the established data accessing authority of the incompatible program, the DEVAR is changed to reflect the change. This is indicated by the authority reset line 316 between 304 and 305.

Accesses that are found invalid under incompatible architecture rules are reflected to the incompatible programming environment in accordance with the incompatible architecture for such violations. The use of a target virtual address larger than the incompatible architecture address to represent incompatible machine access authority states is fully described in U.S. Pat. No. 5,577,231.

Figure 4:
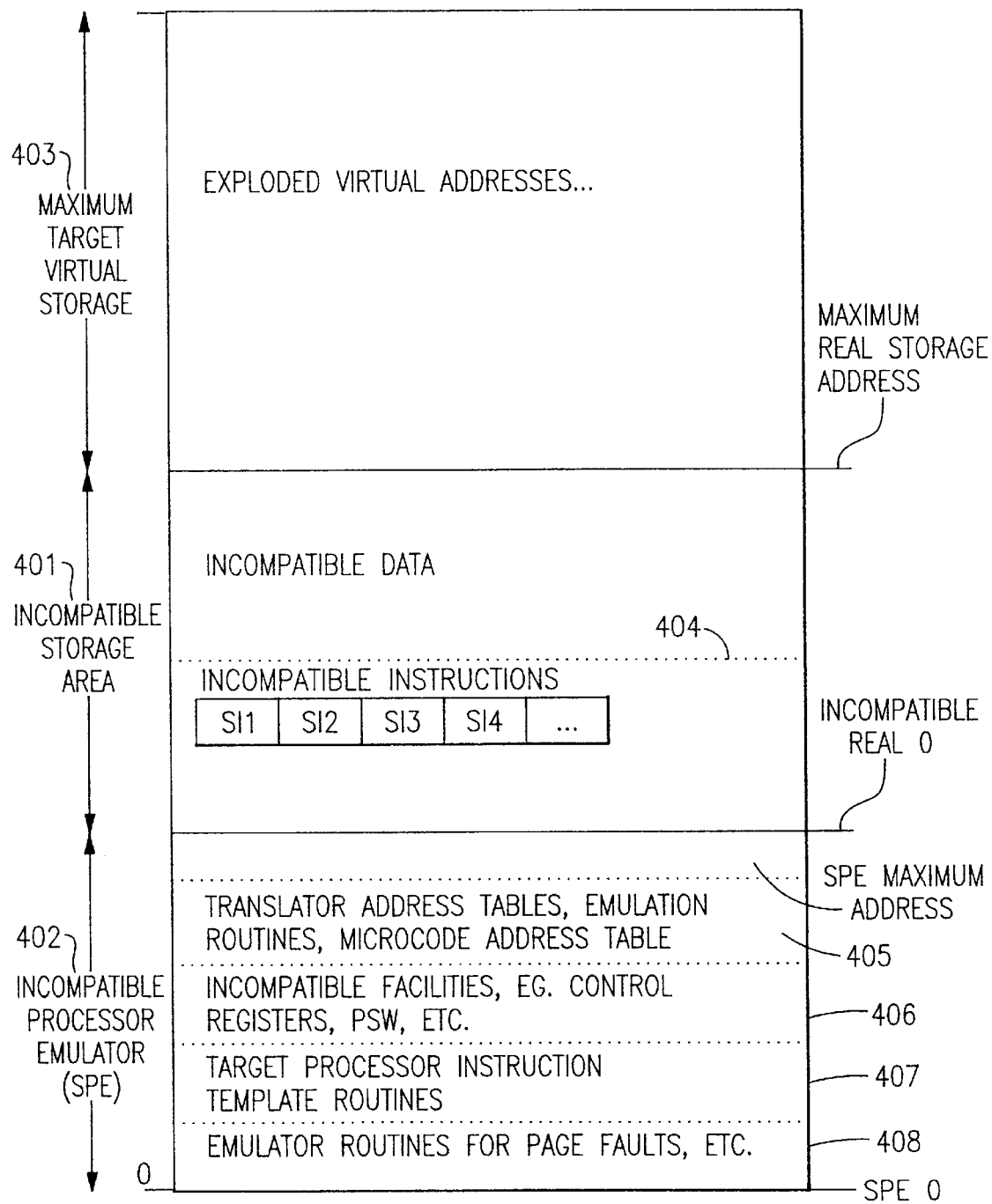
FIG. 4 shows the target machine storage mapping.

In FIG. 4, a contiguous portion of the target real storage is assigned as the incompatible storage area 401 on a sequential address basis. The incompatible storage area begins at the target address labeled INCOMPATIBLE REAL 0 in FIG. 4, and extends to the last storage location required to hold the maximum address in the incompatible storage area, which is the last target location in the area 401. To find an incompatible storage real address in the target storage the target real address of incompatible real storage location zero must be added to it. To provide incompatible program execution, the preprocessor accesses the incompatible instruction addressed by the incompatible instruction address register 204 at its equivalent target storage address. Access of the incompatible instruction is made using a target machine exploded virtual address reflecting the current storage access authority state of the incompatible program for instruction fetching. The overall emulation process interprets that instruction as an incompatible instruction and decomposes it in accordance with the incompatible architecture. For example, where S/390 represents the incompatible architecture, the instruction's operation code, base and index register specifications, displacement, and any other particulars of the specific instruction type would be determined in accordance with the S/390 computer architecture. In this embodiment, this is done in the preprocessor and in the patching instructions, as necessary to provide their assigned functions.

FIG. 4 illustrates the layout of target storage which is used by the described embodiment. The incompatible processor emulator (SPE) area 402 (which manages exceptions) is shown in low storage. Part of the emulator storage SPE area 402 contains all the target processor translation template routines 407 for the incompatible instructions.

Each template routine is found through the Microcode Address Table, described earlier, in area 405. An area 406 is formatted to represent incompatible facilities that must be emulated, e.g. to emulate S/390, the PSW, the Control Registers and Access Registers would be here. This area also holds the target machine address translation tables and general emulator routines for initialization, dumping storage, etc. An area 401 is shown that is assigned for the incompatible real storage, containing incompatible instructions and data as they are allocated space in the incompatible environment by the incompatible operating system, middleware programming and the application programs. Incompatible system page faults are reported to and handled by the incompatible environment, which manages its allocation of storage as it would its own native storage in a non-emulated situation. If a target page fault is caused by an incompatible page being invalid (not backed by incompatible real storage), the incompatible page fault architecture for the page fault is emulated so the incompatible operating system can handle its page fault totally within the incompatible environment. Of course, this incompatible program execution is by emulation as described herein.

For incompatible storage area 401, the address of incompatible storage real address zero is shown as offset from the target real address zero SPE 0. All incompatible real addresses must be offset during emulation by this amount to find the required incompatible real storage location. This area of target storage is assigned and dedicated to incompatible storage on a byte-by-byte basis, one-for-one. The top part of the target storage map illustrates a very large target virtual address range 403 required to represent the access authority states of the incompatible machine architecture. U.S. Pat. No. 5,577,231 describes this in more detail.

FIG. 5 illustrates the process of accessing target instructions and patching them with information specified in the incompatible instruction being emulated. Each target processor translation template routine is written with complete knowledge of the incompatible machine instruction whose function it will perform, and it is coded to make the necessary modifications to the appropriate target instructions in the routine before executing those target instructions one at a time. Three special emulator mode instructions are used to provide the patch function and these are described here. These instructions provide general bit manipulation functions and, therefore, can be added to the microprocessor architecture and implemented as part of the processor chip.

Alternatively, they can be provided as microcoded instructions, or even as subroutines within the emulator, callable to provide the required patching function. These patch instructions are coded in the target translation template routine, as required, to perform the necessary modification of the functional instructions within the template routine. All target instructions are loaded to the Current Instruction Register 501 where they are executed by the processor.

Instructions requiring no modification before execution go directly from the template to 501. However, if a target instruction must be modified by incompatible instruction particulars before execution, it is first loaded to the Patch register 504 where all modifications are made before it is moved to 501 for execution. These actions are performed by three special Patch instructions provided in the processor emulation mode.

The LOAD FOR PATCH instruction depicted in FIG. 6 fetches the target emulation routine instruction immediately following the 'Load For Patch' instruction and loads it into the Patch Register 504.

The PATCH instruction depicted in FIG. 8 updates the Patch Register 504 with bits from the Incompatible Instruction Register 505, as specified by the operands of this instruction. The target bit locator operand 810 in FIG. 8 specifies the beginning bit position of the field in the Patch Register 504 which will be patched. The incompatible bit locator operand 811 specifies the beginning bit position of the patch data contained within the Incompatible Instruction Register 505. The length operand 812 in FIG. 8 specifies how many bits are moved.

The Patch instruction is used when more than one modification must be made to the target instruction before it is executed. The target instruction will not be executed until a Patch and Execute instruction is next executed in the target emulation routine. If only one modification to a target instruction is required before execution, Patch will not be used since Patch and Execute can perform the complete function.

The PATCH AND EXECUTE instruction depicted in FIG. 7 updates the Patch Register 504 with bits from the Incompatible Instruction Register 505, as specified by the operands of this instruction. The target bit locator operand 710 of FIG. 7 specifies the beginning bit position of the target instruction text in the Patch Register 504 which will be patched. The incompatible bit locator operand 711 in FIG. 7 specifies the beginning bit position of the patch data contained within the Incompatible Instruction Register. The length operand 712 in FIG. 7 specifies how many bits are moved. After the patch operation is completed, the contents of the Patch Register 504 are moved to the Current Instruction Register 501 to complete the execution of the Patch and Execute instruction. The patched target instruction is executed in the current instruction register 501.

The patch instructions will extract, from the patch information, the fields that will be used to modify target instructions in the target code template. Incompatible Instruction register 505 is the source of the patching information in all patching operations. The hardware patch register 504 is where the target instruction modification takes place. The first target instruction is addressed by the target instruction address register 212 as a consequence of the branch instruction executed by the preprocessor function at the end of its processing of an incompatible instruction. The instructions in the translation routine are executed normally by the processor by being loaded into the current instruction register 501 and then executed from there. This is illustrated in FIG. 5 by the lines 533, 538, and 539. Line 534 illustrates the path of a target instruction that must be patched before it can be executed. It is loaded to the patch register 504 where it is the object of the Patch and the Patch and Execute instructions, after which it is itself executed in its modified form. Thus, in terms of their order of execution by the target processor, the instructions of the translation routine which are shown in FIG. 5 are executed in the order 521, 523, 524, 522, 525.

To review, the patch instructions are Load for Patch, Patch, and Patch and Execute. Load for Patch places the target instruction following the Load for Patch instruction in the template routine into the Patch Register 504. The Patch instruction extracts fields from the patch information, the incompatible instruction in this embodiment, and replaces fields in the target instruction in the Patch Register 504 with those extracted fields, to reflect the incompatible instruction instance as it was coded. Patch is useful where more than one patch operation is required on a target instruction to emulate the incompatible instruction. Patch and Execute performs the last extract and modify operation and then sends the resulting target instruction to the normal processor instruction register 501 for execution.

In the example shown, in incompatible instruction register 505 two fields from the incompatible instruction modify the target instruction before it is executed. Each instruction is loaded into the processor current instruction register 501 where it is executed by normal processor functions. Box 520 contains the instructions of the template of the example, labeled 521, 522, 523, 524 and 525. However, target instructions that must be modified before execution first are loaded into the Patch Register 504, where all modifications are made, and then loaded to the Current Instruction Register 504 for execution.

The Load for Patch instruction loads the next instruction 522 into the Patch Register 504. This is illustrated in FIG. 5 by line 534. The next instruction executed by the target processor in emulator mode is the Patch instruction 523 in the template routine. Its action is depicted by line 535 in FIG. 5. It moves the indicated field from the incompatible instruction image in 505 to replace the indicated field in the target instruction in the Patch Register 504. The next instruction executed is the Patch and Execute 524 in the template routine. Its first action is depicted by line 536, replacing a second field in the target instruction with a different field from the incompatible instruction.

After the patch operation is complete, in the Patch and Execute instruction's second action, depicted by line 537, the target instruction is presented to the processor for normal execution in its modified state by being moved into instruction register 501. Thus, the instructions in the template are actually executed by the processor in the order 521, 523, 524, 522, 525. Target instruction 525 signals the end of the template and directs the processor back to the preprocessor to decode the next incompatible instruction.

In this example, in emulating S/390 on a PowerPC RISC processor (the target processor), the S/390 LOAD REGISTER instruction is emulated by a PowerPC ADD IMMEDIATE instruction. The S/390 LOAD REGISTER, shown as the content of the incompatible instruction register 505 in FIG. 5, is two bytes in length. Bits 0–7 contain the operation code ('18'x), bits 8–11 contain the R1 register, or target, and bits 12–15 contain the R2 register. In the example presented in FIG. 5, R1=2, and R2=3. The PowerPC ADD IMMEDIATE instruction, shown as the target instruction loaded into the patch register by the Load for Patch instruction in FIG. 5, is four bytes in length. Bits 0–5 contain the operation code ('14'x), bits 6–10 contain the RT register, or target, bits 11–15 contain the RA register, or incompatible instruction, and bits 16–31 contain the SI field, or immediate data. When emulating a LOAD REGISTER instruction, the SI field of the PowerPC ADD IMMEDIATE instruction is zero. In FIG. 5, LOAD FOR PATCH loads the Patch Register 504 with the ADD IMMEDIATE skeleton. A Patch instruction is used to move 4 bits beginning at bit position 8 of the Incompatible Instruction Register 505 to the Patch Register 504 beginning at bit position 6. A Patch And Execute instruction is used to move 4 bits beginning at bit position 12 of the Incompatible Instruction Register to the Patch Register beginning at bit position 11, and then load the Current Instruction Register 501 with the fully patched ADD IMMEDIATE instruction for execution by the processor.

Completion of a target processor translation template routine is signaled by an End Routine instruction found at the end of each target translation template routine. This directs the processor to return to the preprocessor function to decode the next incompatible instruction and to find the template routine address for the next incompatible instruction. A template routine may contain many sets of these patch instructions, including multiple Patch and Execute instructions for multiple target instructions of a single incompatible instruction target translation template routine. Also, target instructions will be found in the translation templates that require no patching and will execute in register 501, after being moved there directly, as the patch instructions themselves execute.

Figure 9:
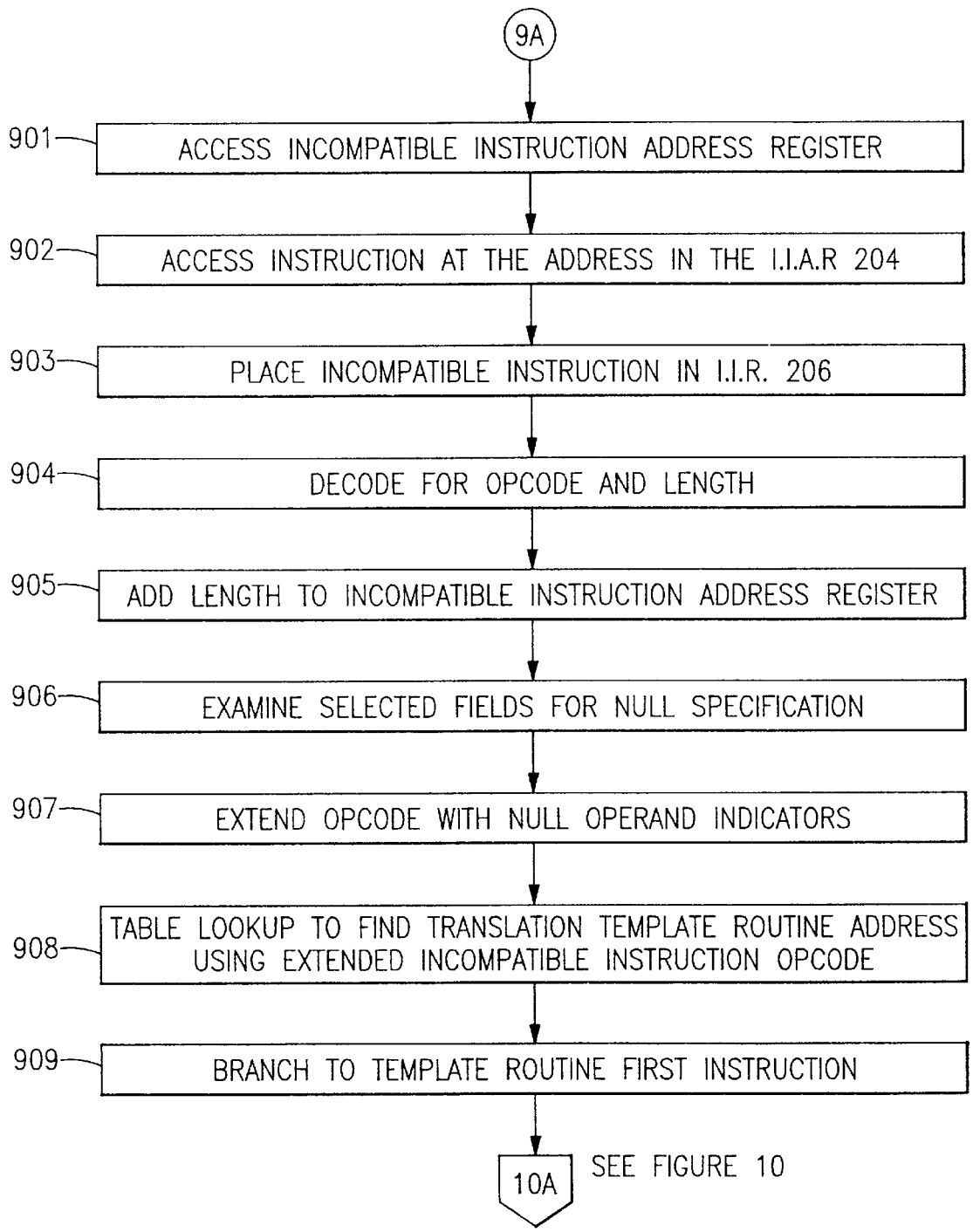
FIG. 9 depicts the logic of incompatible instruction interpretation.

FIGS. 9 through 15 show the process of preprocessing, patching, and executing instructions in emulation mode. FIG. 9 depicts the operation of the preprocessing function. Step 901 accesses the content of the incompatible instruction address register to find out the location of the next incompatible instruction to be executed. It uses this address to access the incompatible instruction in step 902, and loads it into the incompatible instruction register 505 in step 903. At step 904, it decodes the incompatible instruction in accordance with incompatible processor instruction format architecture to obtain its opcode and length. The length is added to the incompatible instruction address register 204 at step 905. Step 906 examines certain selected fields of the instruction for null. These fields are chosen because experience has shown that they are often coded as null, and if they are null, the target translation routine assuming them to be null can contain fewer target instructions and therefore provide faster emulation of those instruction instances.

A bit is assigned for each field that is examined for null in the incompatible instructions, with one state meaning null and the other meaning that the field was coded non-null in the instance being examined. The field of these bits is appended to the incompatible instruction opcode in step 907 to form the value used for a table lookup in step 908 in the Microcode Address Table 205 to find the address of the proper target translation template routine to perform the function of the incompatible instruction. Step 909 branches to the first instruction of the selected translation routine, completing preprocessing on the current incompatible instruction. Control passes to entry point 10A on FIG. 10 which depicts execution of the instructions in the translation routine.

Figure 10:
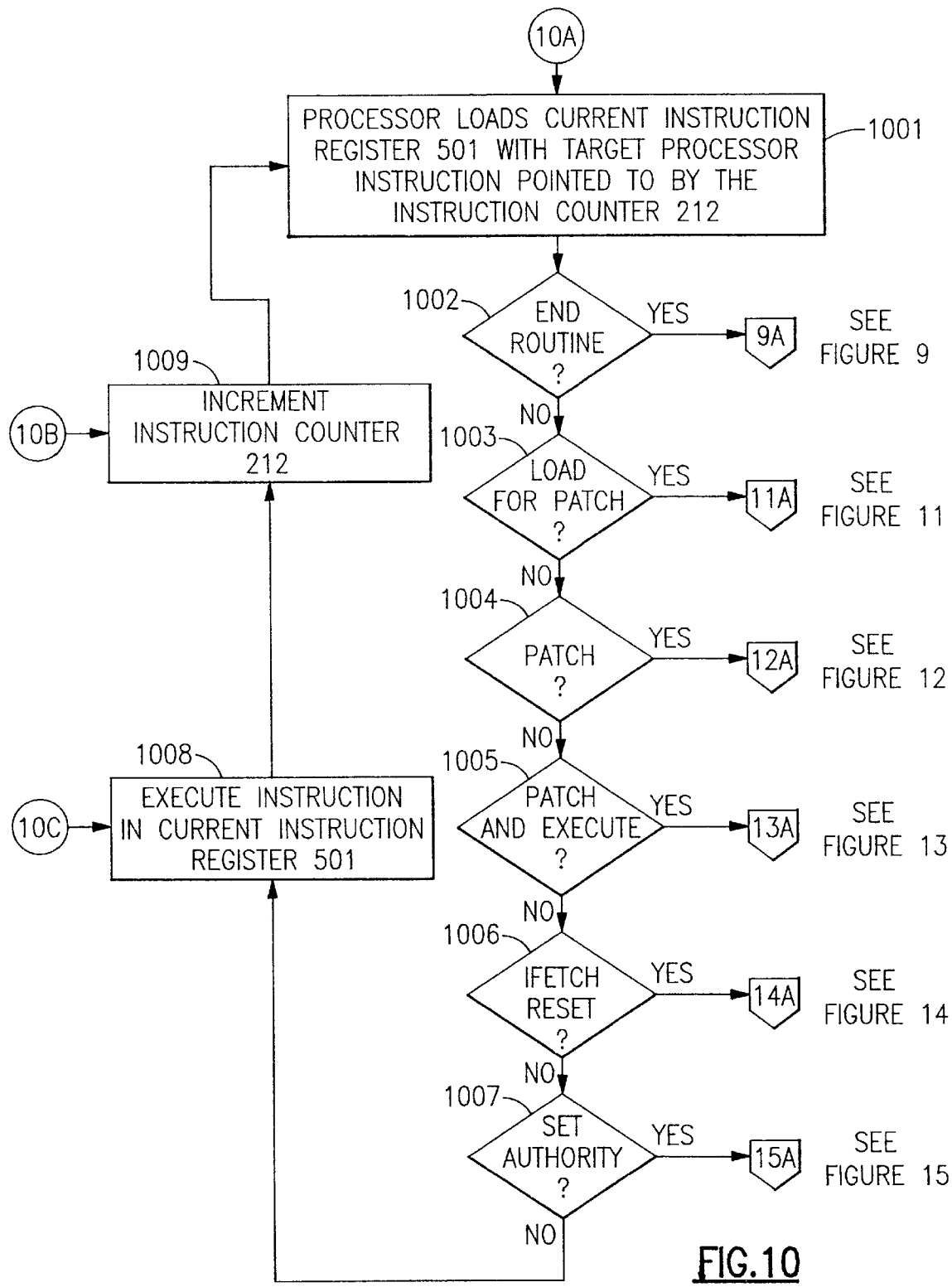
FIG. 10 depicts the processor emulation mode execution logic.

In FIG. 10 at step 1001 the instruction addressed by the instruction address register 212 is loaded into the processor's current target instruction register 501 for execution. This is depicted in FIG. 5 by the line labeled 533. Box 1001 tests the target processor operation code in the current instruction register to ascertain if it is one of the patch instructions, or the End Routine instruction which indicates the end of the translation template routine. If the instruction is End Routine, Load for Patch, Patch, Patch and Execute, Ifetch Reset or Set Authority, control passes to the appropriate process starting at entry points 9A, 11A, 12A, 13A, 14A or 15A. If not, at step 1008, the processor executes the instruction. The target instruction address register 212 is incremented at step 1009, and control returns to step 1001 to interpret the next target instruction.

Figure 11:
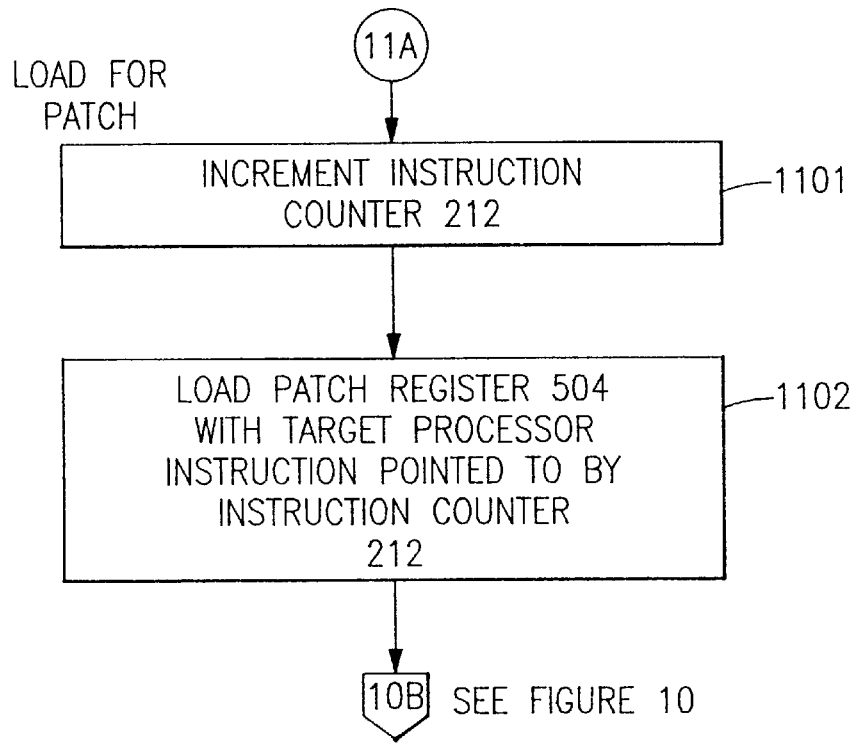
FIG. 11 depicts the processor execution logic for a Load for Patch instruction execution.

Step 1002 tests the instruction in the current instruction register to ascertain whether or not it is an End Routine. If it is, control passes to entry point 9A on FIG. 9. If not, the instruction is tested at step 1003 for being a Load for Patch instruction. If it is, control passes to entry point 11A on FIG. 11. If not, the instruction is tested for being a Patch instruction at step 1004. If it is, control passes to entry point 12A on FIG. 12. If not, the instruction is tested for being a Patch and Execute instruction at step 1005. If it is, control passes to entry point 13A on FIG. 13. If not, the instruction is tested for being an Ifetch Reset. If it is, control passes to entry point 14A on FIG. 14. If not, the instruction is tested for being a Set Authority. If it is, control passes to entry point 15A on FIG. 15. If not, the instruction is executed at 1008, the instruction count in register 501 is incremented at step 1009 and control returns to entry point 10A at 1001. FIG. 11 describes the processing of the Load for Patch instruction which, at step 1101, increments the target instruction count in register 212 to address the instruction following the Load for Patch instruction, which following instruction is to be loaded into the patch register.

Figure 12:
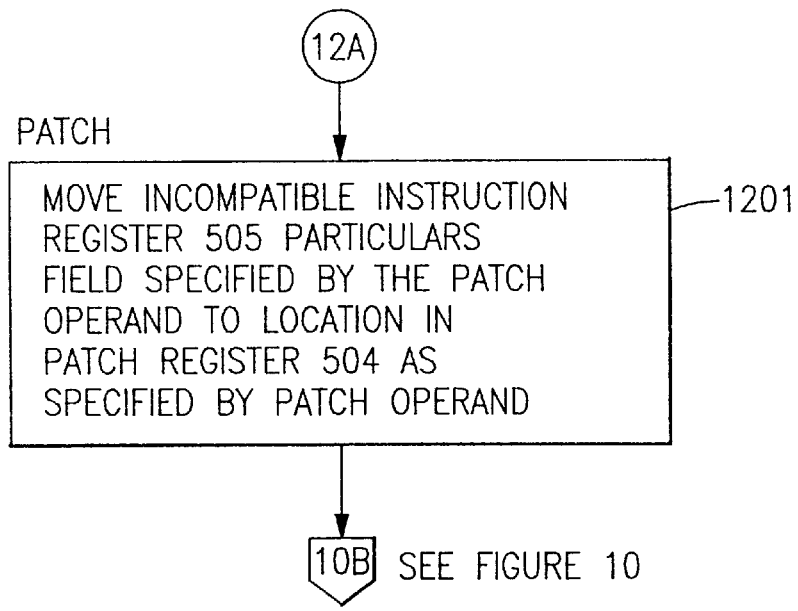
FIG. 12 depicts the processor execution logic for a Patch instruction execution.

Then step 1102 loads the patch register 504 with that next instruction in the template routine, which is now addressed by the instruction count in register 212. Control returns to entry point 10B on FIG. 10 to process the next instruction in the translation template. FIG. 12 describes the processing of the Patch instruction, which moves particulars of the incompatible instruction image to overwrite portions of one of the target processor instructions that will perform the equivalent function. At step 1201, the field, starting at an offset specified in the Patch instruction and of a length specified in the Patch instruction, as shown in FIG. 8, is accessed in the incompatible instruction register 505 and moved to overwrite the instruction in the Patch register 504 starting at the offset specified in the Patch instruction for that purpose. This is illustrated in FIG. 5 by the line labeled 535. Control passes to entry point 10B on FIG. 10.

Figure 13:
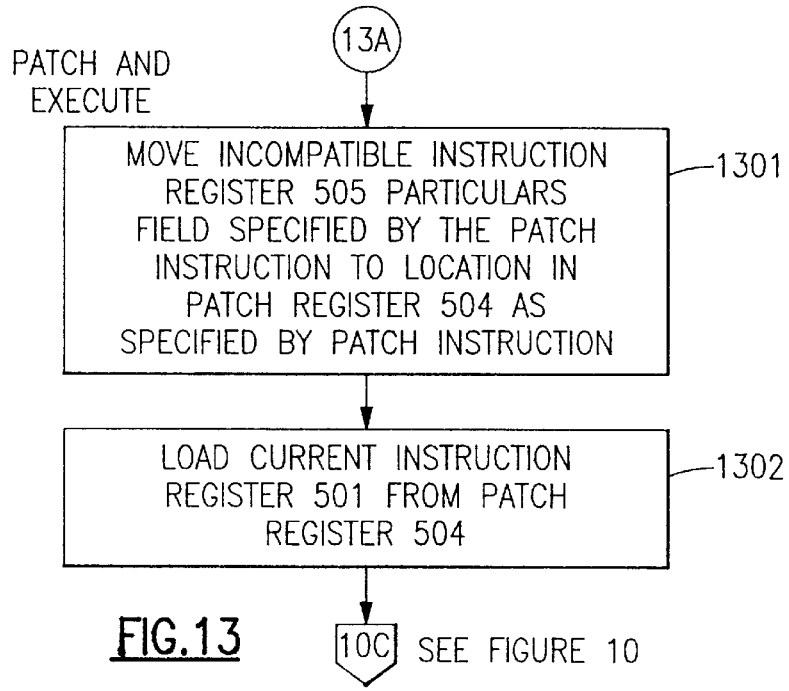
FIG. 13 depicts the processor execution logic for a Patch and Execute instruction execution.

FIG. 13 shows the processing of the Patch and Execute instruction. The incompatible instruction field specified in the instruction is accessed in the incompatible instruction register 505 and overwrites the specified field specified in the instruction, whose format is shown in FIG. 7, in the patch register 504, at step 1301. This is illustrated by the line labeled 536 in FIG. 5. The content of the patch register 504 is then loaded to the current instruction register 501 in step 1302. This is illustrated in FIG. 5 by the line labeled 537. Control passes to entry point 10C on FIG. 10, in order to execute the modified instruction.

Figure 14:
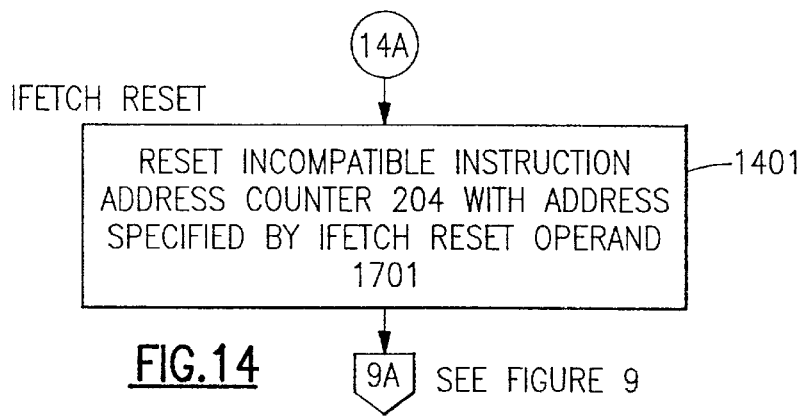
FIG. 14 depicts the processor execution logic for a Ifetch Reset instruction execution.

FIG. 14 shows the processing of the Ifetch Reset instruction. Step 1401 loads the incompatible instruction address register 204 with the address specified by the Ifetch Reset instruction operand. Control returns to step 9A on FIG. 9 to preprocess the incompatible instruction at the new incompatible execution location.

Figure 15:
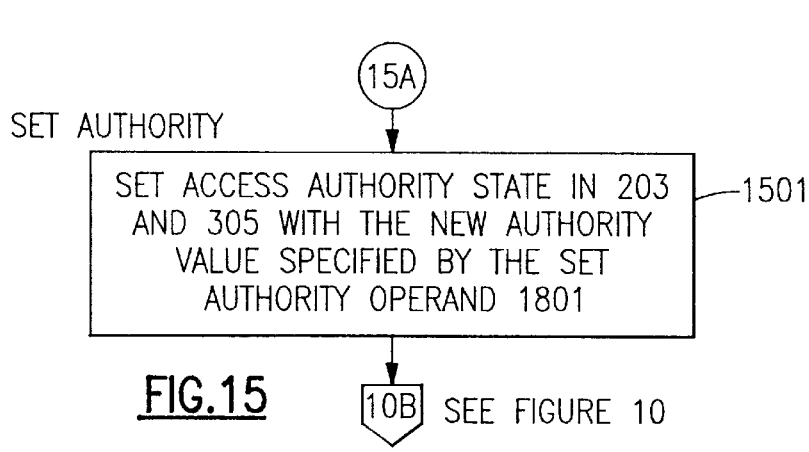
FIG. 15 depicts the processor execution logic for a Set Authority instruction execution.

FIG. 15 shows the processing of the Set Authority instruction. At step 1501 the access authority state value in 203 and 305 is replaced by the new value specified by the Set Authority instruction operand 1801. Control returns to step 10B on FIG. 10.

FIGS. 16, 17, and 18 show the format of the End Routine, the IFETCH Reset and the Set Authority instructions.

FIG. 19 depicts the instruction translation template for execution on a PowerPC processor of a S/390 load-register-from-storage instruction, whose format is shown in the Figure. Here an effective address must be used to access incompatible storage area, calculated in incompatible architecture by performing the sum of the content of the specified B register and the content of the specified X register plus the displacement D. R specifies the incompatible register to be loaded from incompatible storage. The emulation of an S/390 LOAD instruction, specifying both a B register and an X register, requires three PowerPC instructions. First an ADD instruction is needed to add the contents of the B and X registers. Then an RLDIMI instruction is needed to insert the resulting address value into the address portion of the DEVAR, thereby providing the incompatible data address with the needed authorization state attached. Finally, an LWZ instruction loads the appropriate R register from the specified address with displacement D added. The target instructions need to be patched to contain the S/390 particulars, R, X, B and D. The template in FIG. 19 begins with a Load For Patch, specifying the ADD instruction. The Patch instruction is used to update the ADD instruction with the S/390 X value. The Patch and Execute instruction updates the ADD instruction with the S/390 B value and then completes by executing the ADD instruction which combines the contents of the B and X registers. The next target instruction executed does not require patching. The PowerPC RLDIMI instruction causes the address calculated by the ADD instruction to be inserted into the address portion of the DEVAR register. The DEVAR register contains the S/390 authority state in the high-order bit positions.

The template next contains a Load For Patch instruction specifying the PowerPC LWZ instruction. The following Patch instruction updates the LWZ to contain the S/390 D value. Next, the Patch and Execute instruction updates the LWZ instruction with the S/390 R value and completes the execution of the LWZ instruction, which loads R from the incompatible data area specified by the sum of the S/390 B, X and D values. The template routine ends with the End Routine instruction, which transfers target processor execution to the preprocessor to start execution of the next incompatible incompatible instruction.

FIG. 20 illustrates a different template for the same S/390 Load-register-from-storage instruction type, where the preprocessor finds that no X register field has been specified. A separate template routine is provided for such a case. Since the X field of the incompatible instruction instance to be executed is zero, only the address in the specified B register, as modified by the addition of the displacement D, supplies the incompatible storage address. Since X is not specified, the target processor ADD instruction to combine the contents of the B and X registers is not needed, allowing a shorter template to be specified. As a result, execution of the incompatible instruction is faster than if the template in FIG. 19 were used for all cases of that incompatible instruction type. This example is used to illustrate the flexibility of the invention in providing a tradeoff between the complexity of the preprocessor in decoding incompatible instructions, and the performance obtained from the emulation.

In the case of S/390, several cases of fields often not coded in certain classes of instructions can be determined. A tradeoff can be made as to the performance benefit of having these cases recognized by the preprocessor on a one-for-one basis, with separate templates provided for their execution. Examples of fields that can be checked for null values are displacements, X register fields, B register fields, with corresponding simpler target instruction template routines where those fields are null in the incompatible instruction instance to be executed.

The six special instructions have been described in the embodiment as instructions. As such they can be implemented as hardware functions of a microprocessor or as microcoded instructions. Alternatively, they can be expressed as macroinstructions and compiled as program calls to routines in the emulator that perform the required functions when called. Also, although the preferred embodiment shows the IEVAR 203 and the DEVAR 305 as separate registers, other embodiments may use the same target hardware register to perform both functions, and it may be termed the incompatible-instruction data address register since the target process accesses the incompatible instructions as its data. Other embodiments may use several target registers to hold the addresses of the incompatible instructions and the addresses of the operand data accessed by the incompatible instructions.

While we have described our preferred embodiments of our invention, it will be understood that those skilled in the art, both now and in the future, may make various improvements and enhancements which fall within the scope of the claims, which follow. These claims should be construed to maintain the proper protection for the invention first disclosed herein.

What is claimed is:

1. An emulation method for executing an incompatible computer program on a target processor, the incompatible program containing computer instructions natively executable on a different processor built to a computer architecture incompatible with target architecture used for building a target system containing the target processor, the target architecture defining target instructions executable on the target processor and the incompatible architecture defining execution results for the incompatible instructions, the emulation method comprising storing in a target system memory one or more target routines for each operation code provided in the incompatible instructions of the incompatible program, and each target routine performing a function similar to, but not necessarily identically to, a corresponding incompatible instruction, associating one or more patching instructions with a target instruction in a target routine when the target instruction requires modification for enabling the target routine to provide execution results identically to execution results defined for the corresponding incompatible instruction by the incompatible architecture, and not associating any patching instruction with any target instruction not requiring modification for enabling the target routine to provide execution results identically to the corresponding incompatible instruction, each target instruction in a target routine being associated with none, one, or more patching instruction(s) of the target routine, accessing in an emulation sequence the incompatible instructions stored as data in a target system memory, the emulation sequence being determined by sequentially selecting each next incompatible instruction to be next emulated for the incompatible program except when emulation results obtained for a previously emulated incompatible instruction determines the next incompatible instruction to be non-sequential during the emulation of the incompatible program, utilizing contents of each accessed incompatible instruction, including at least the opcode, to select the corresponding target routine for emulating the accessed incompatible instruction, preprocessing each target instruction in the corresponding target routine having one or more associated patching instructions for modifying the target instruction for enabling execution of the target routine to provide execution results identical to execution results defined for the accessed incompatible instruction, and no preprocessing being done for any target instruction not having any associated patching instruction, and executing by the target processor each target instruction in the corresponding target routine after any preprocessing is completed for modifying the target instruction, and executing each target instruction without preprocessing if no patching instructions are associated with the target instruction.

2. An emulation method for executing an incompatible computer program on a target processor, as defined in claim 1, the emulation method further comprising accessing a next preprocessing instruction in the corresponding target routine after an execute type of patching instruction is detected to indicate modification of a last preprocessed target instruction is completed by execution of one or more patching instructions.

3. An emulation method for executing an incompatible computer program on a target processor, as defined in claim 2, the emulation method further comprising accessing the next incompatible instruction for the incompatible program after the next preprocessing instruction in the corresponding target routine is detected to be an end routine type of preprocessing instruction indicating completion of execution of the corresponding target routine.

4. An emulation method for executing an incompatible computer program on a target processor, as defined in claim 3, the emulation method further comprising execution of the one or more target instructions in the corresponding target routine performing accesses of data operands of the corresponding incompatible instruction in the target system memory, and utilizing the accessed data operands for generating execution results of the incompatible instruction.

5. An emulation method for executing an incompatible computer program on a target processor, as defined in claim 4, the emulation method further comprising determining a data address for a next incompatible instruction to be accessed in the target system memory by adding the length of a last accessed incompatible instruction to the address in the target system memory of the last accessed incompatible instruction, and resetting the data address for the next incompatible instruction to target processor execution results of the last accessed incompatible instruction when the execution results indicate a branch in the execution sequence of the incompatible instructions for the incompatible program.

6. An emulation method for executing an incompatible computer program on a target processor, as defined in claim 5, the emulation method further comprising concatenating an authority value with the data address to form an exploded virtual address for accessing a next incompatible instruction in the target system memory, and the authority value being provided by target processor execution results of one or more previously emulated incompatible instructions.

7. An emulation method for executing an incompatible computer program on a target processor, the incompatible program containing computer instructions executable on a different processor built to a computer architecture incompatible with target architecture used for building a target system containing the target processor, the target architecture defining target instructions executable on the target processor and the incompatible architecture defining execution results for the incompatible instructions, the emulation method comprising storing in a target system memory of the target processor at least one target routine for each operation code found in the incompatible instructions of the incompatible program, each target routine including one or more target instruction(s), and each incompatible instruction in the incompatible program associated with a corresponding target routine accessed by utilizing information obtained in a corresponding incompatible instruction, associating one or more patching instructions with each target instruction requiring preprocessing modification for enabling the target routine to function identically to the corresponding incompatible instruction, and not associating any patching instruction with any target instruction not requiring preprocessing modification for enabling the target routine to function identically to the corresponding incompatible instruction, wherein each target instruction in a target routine may be respectively associated with none, one, or more than one, patching instruction(s), executing a target instruction after completing any preprocessing modification if one or more patching instructions are associated with the target instruction, and executing a target instruction without preprocessing modification if no patching instructions are associated with the target instruction, and executing the target instructions in a sequence indicated in the corresponding target routines, and completing emulation of each corresponding incompatible instruction in the incompatible program when all target instructions have been executed in the corresponding target routine.

8. An emulation method for executing an incompatible computer program on a target processor, as defined in claim 7, the emulation method further comprising storing in the target system memory a plurality of target routines for one operation code used in the incompatible instructions of the incompatible program, the plural target routines being associated with different forms of incompatible instruction instances using the one operation code, the different forms including specifying a null value or a non-null value for a like operand of the incompatible instruction instances using the same operation code, wherein a lesser number of patching instructions are in the target routine for the incompatible instruction instances having a null-value operand than in a target routine for the incompatible instruction supporting all operands as having any values including both null and non-null values, wherein target system performance is improved when the corresponding target routine emulates an incompatible instruction instance having at least one null operand by enabling the corresponding target routine to execute a smaller number of target instructions.

9. An emulation method for executing an incompatible computer program on a target processor, as defined in claim 7, the emulation method further comprising detecting a load-for-patch instruction in a target routine for identifying an associated target instruction as requiring modification by a patch operation prior to being in a condition for execution by the target processor, and detecting a target instruction not associated with any load-for-patch instruction as a target instruction which is in a condition for execution by the target processor.

10. An emulation method for executing an incompatible computer program on a target processor, as defined in claim 9, the emulation method further comprising locating one or more patching instruction(s) associated with the target instruction for specifying one or more patching operation(s) on the target instruction, each patching instruction defining one or more field(s) of bits in the target instruction to be modified by one or more field(s) of bits defined in the corresponding incompatible instruction.

11. An emulation method for executing an incompatible computer program on a target processor, as defined in claim 10, the emulation method further comprising executing an execute-type of preprocessing instruction in the target routine to indicate patching modification is completed for an associated target instruction.

12. An emulation method for executing an incompatible computer program on a target processor, as defined in claim 11, the emulation method further comprising executing the associated target instruction in response to execution of the execute-type of preprocessing instruction which indicates all modification of the associated target instruction is completed.

13. An emulation method for executing an incompatible computer program on a target processor, as defined in claim 11, the emulation method further comprising executing on the target processor a patching operation on the associated target instruction as part of the execution of the execute-type of preprocessing instruction before executing the associated target instruction.

14. An emulation method for executing an incompatible computer program on a target processor, as defined in claim 13, the emulation method further comprising associating with a target instruction the load-for-patch instruction and additional patching instruction(s) by locating the these instructions at predetermined location(s) relative to the target instruction in the associated target routine, and locating an execute-type of preprocessing instruction as a last patching instruction associated with the target instruction to initiate complete modification and to initiate execution of the associated target instruction by the target processor.

15. An emulation method for executing an incompatible computer program on a target processor, as defined in claim 7, the emulation method further comprising storing in the target system memory at least one target routine for each operation code defined in the incompatible architecture, to enable the target processor to emulate any incompatible program based on the incompatible architecture.

16. An emulation method for executing an incompatible computer program on a target processor, as defined in claim 15, the emulation method further comprising fetching each incompatible instruction as data from the target system memory for representing the next incompatible instruction to be emulated in an incompatible program, interpreting each fetched incompatible instruction to determine its operation code, instruction type, instruction format, operand locations, and patch field information, and utilizing at least the operation code to access an entry in a coded routine-location table in the target system memory, the entry containing a target address of a corresponding target routine in the memory for emulating the incompatible instruction.

17. An emulation method for executing an incompatible computer program on a target processor, as defined in claim 16, further comprising storing a target routine address obtained from the table for the corresponding target routine to make the target routine address available to the target processor, and also storing with the target routine address other instruction information obtained from the incompatible instruction.

18. An emulation method for executing an incompatible computer program on a target processor, as defined in claim 7, the emulation method further comprising obtaining by the target processor each next target routine address in the order that target routine addresses are obtained from the routine address table for an emulation sequence of incompatible instructions, utilizing each next target routine address for accessing a next target routine for execution by the target processor, and preprocessing any patching instructions for each target instruction in the target routine for modifying the target instruction, and executing all target instructions in execution sequence in the target routines whether or not any target instruction is associated with any patching instruction(s).

19. An emulation method for executing an incompatible computer program on a target processor, as defined in claim 18, the emulation method further comprising accessing any next target instruction in a corresponding target routine, executing by the target processor any patching instructions associated with the target instruction, then executing the target instruction if any required patching is completed, and executing the target instruction without any patching modification if no patching instructions are associated with the target instruction, and repeating the accessing and executing steps for each next target instruction to be executed in the corresponding target routine until all target instructions in the corresponding target routine are executed.

20. An emulation method for executing an incompatible computer program on a target processor, as defined in claim 7, the emulation method further comprising fetching each incompatible instruction from the target system memory as a next incompatible instruction to be emulated in the incompatible program, interpreting an operation code of each fetched incompatible instruction to determine type, format and patch field information of the incompatible instruction, utilizing at least the operation code to access an entry in a coded table in target system memory, the entry containing a target routine address of a corresponding target routine in the memory for emulating the incompatible instruction, determining an instruction length for the incompatible instruction, and providing the instruction length to an instruction address register for generating an address therein of the next sequential incompatible instruction in the incompatible program, and storing the address of the next sequential incompatible instruction provided by the instruction address register in an incompatible instruction address register for accessing a next incompatible instruction from the target system memory.

21. An emulation method for executing an incompatible computer program on a target processor, as defined in claim 20, the emulation method further comprising utilizing the target routine address obtained by the target processor for accessing a first target instruction in a corresponding target routine, and executing by the target processor any patching instruction (s) associated with the first target instruction, and then executing the target instruction after any patching instruction execution is completed, and executing the first instruction without executing any patching instruction if no patching instruction is associated with the target instruction.

22. An emulation method for executing an incompatible computer program on a target processor, as defined in claim 21, the emulation method further comprising accessing by the target processor each next target instruction in the corresponding target routine if any target instruction(s) follow the first target instruction in the target routine, executing by the target processor any patching instructions associated with each next target instruction, and then executing the target instruction after any required patching is completed, but executing the target instruction without executing any patching instruction if no patching instruction is associated with the target instruction, and repeating the accessing and executing steps for each next target instruction in the corresponding target routine until all target instructions in the corresponding target routine are executed.

23. An emulation method for executing an incompatible computer program on a target processor, as defined in claim 22, the emulation method further comprising storing an image of the computer instruction in addition to the target routine address and incompatible instruction address, to represent fields in the incompatible instruction to be used by patching instructions for patching one or more target instructions in a corresponding target routine.

24. An emulation method for executing an incompatible computer program on a target processor, as defined in claim 23, the emulation method further comprising determining an instruction length for the incompatible instruction, adding the instruction length to a current instruction address in an incompatible instruction address counter for generating an address of a next sequential incompatible instruction in the incompatible program, storing the generated address in the incompatible instruction address counter as a next incompatible instruction address for accessing a next incompatible instruction as target instruction data from the target system memory, and providing the next incompatible instruction address to an incompatible instruction address register for accessing the next incompatible instruction as target data from the target system memory.

25. An emulation method for executing an incompatible computer program on a target processor, as defined in claim 24, the emulation method further comprising setting a low-order section of the incompatible instruction data address register to the next incompatible instruction address provided by an incompatible instruction address counter, setting a high-order section of the incompatible instruction data address register to an access authority state, and utilizing the entire content of the incompatible instruction data address register as a virtual address in the target system memory in which the high-order section supports incompatible authority controls of the incompatible architecture in the target system, even though the incompatible authority controls are transparent to the target processor.

26. An emulation method for executing an incompatible computer program on a target processor, as defined in claim 25, the emulation method further comprising branching in the emulated execution of the incompatible program by replacing the low-order section of the incompatible instruction data address register with a branch address obtained by the target processor from execution of a corresponding target routine emulating the execution of an incompatible branching instruction.

27. An emulation method for executing an incompatible computer program on a target processor, as defined in claim 26, the emulation method further comprising controlling access authority within the emulated execution of the incompatible program by replacing the high order section of the incompatible instruction data address register with an authority value obtained by the target processor from execution of a corresponding target routine emulating the execution of an incompatible authority control instruction.

28. An emulation method for executing an incompatible computer program on a target processor, as defined in claim 27, the emulation method further comprising sizing the incompatible instruction data address register to contain a number of bits at least equal to the number of bits in each target processor virtual address, and separating the content of the incompatible instruction data address register into an incompatible instruction address section and an authority section, in which the size of the incompatible instruction address section has at least a number of bit positions equal to the size of each incompatible program address, and the size of the authority section is up to the remaining bit positions in the target processor virtual address not used for containing the incompatible instruction address.

29. An emulation method for executing an incompatible computer program on a target processor, as defined in claim 28, the emulation method further comprising mapping authority areas in the target processor's virtual memory, an authority area being located in the target processor's virtual memory by a target virtual address comprised of the authority value concatenated with zero-value low-order bits equal in number to the size of the incompatible instruction address.

30. An emulation method for executing an incompatible computer program on a target processor, as defined in claim 9, the emulation method further comprising loading a target instruction following each load-for-patch instruction into a register of the target processor, and modifying the target instruction in the register as specified by each following patching instructions located prior to any following load-for-patch instruction.

31. An emulation method for executing an incompatible computer program on a target processor, as defined in claim 29, the emulation method further comprising executing a next-incompatible-instruction routine in the target processor for obtaining a next incompatible instruction address for the incompatible instruction counter to be used for fetching data from the target system memory for representing a next incompatible instruction by executing a target instruction in a target routine to obtain a target instruction operand which is the required data representing the next incompatible instruction in the target system, since the next incompatible instruction is stored as data in the target system memory, wherein processing for the incompatible instructions by the target processor is never recognized by the target processor as execution of the incompatible instructions.

32. An emulation method for executing an incompatible computer program on a target processor, as defined in claim 31, the emulation method further comprising initiating the execution of the next-incompatible-instruction target routine for fetching data representing a next incompatible instruction upon completion of execution for each target routine for an incompatible instruction.

33. An emulation method for executing an incompatible computer program on a target processor, as defined in claim 32, the emulation method executing a next-incompatible-instruction target routine for:

fetching from the target system memory operand data of a target instruction representing a next incompatible instruction upon completion of execution by the target processor of each target routine for an incompatible instruction, and interpreting content of each fetched incompatible instruction to determine fields in the incompatible instruction to be used for selecting an address of a corresponding target routine from a table of target routine addresses in the target system memory.

34. An emulation method for executing an incompatible computer program on a target processor, as defined in claim 33, the emulation method further comprising executing a target instruction for utilizing at least the operation code interpreted in the fetched incompatible instruction to select from the table of target routine addresses an address of a corresponding target routine, putting in a target processor register the address of the corresponding target routine selected from the table, and optionally putting in the register the address of the incompatible instruction and an image of the incompatible instruction to represent fields available to patching instructions for modifying one or more target instructions in the corresponding target routine, and accessing the target routine in target system memory for execution by the target processor.

35. An emulation method for executing an incompatible computer program on a target processor, as defined in claim 34, the target routine interpreting the fetched incompatible-instruction further performing the steps of:

generating a next address for accessing a next sequential incompatible instruction in the incompatible program by adding an instruction length of the fetched incompatible instruction to a current incompatible-instruction-address counter for generating the next address which will be used for sequentially fetching a next incompatible instruction of the incompatible program, and storing the generated next address in an incompatible instruction address register for fetching the next incompatible instruction in the target system memory.

36. An emulation method for executing an incompatible computer program on a target processor, as defined in claim 35, the last storing step in the emulation method further comprising setting a low-order section of the incompatible instruction data address register to the generated next operand address, setting a high-order section of the incompatible instruction data address register to an access authority state, and utilizing the entire content of the incompatible instruction data address register as a virtual address in the target processor memory for enforcing authority controls of the incompatible architecture in the target system.

37. An emulation method for executing an incompatible computer program on a target processor, as defined in claim 36, the emulation method further comprising branching in the emulated execution of the incompatible program by replacing the low-order section of the incompatible instruction data address register with a branch address provided by the target processor executing a target routine emulating the execution of an incompatible branching instruction.

38. An emulation method for executing an incompatible computer program on a target processor, as defined in claim 37, the emulation method further comprising resetting the high-order section of the incompatible instruction data address register by the target processor executing a target routine providing an access authority value while emulating an authority-control incompatible instruction.

39. An emulation method for executing an incompatible computer program on a target processor, as defined in claim 38, the emulation method further comprising checking the access authority value in the high-order section of the incompatible-instruction data address register during execution of an incompatible program to determine if the access authority value is the value required to make the storage access to the incompatible instruction.

40. An emulation method for executing an incompatible computer program on a target processor, as defined in claim 39, the emulation method further comprising setting a low-order section of a target-processor register used as an incompatible-instruction data address register for containing an incompatible-instruction effective address for a storage operand of the incompatible instruction being emulated by executing one or more target instructions for the target routine to compute the incompatible-instruction effective data address and put it into the target-processor register, setting a high-order section of the target incompatible-instruction data address register to an access authority assigned to the incompatible program being emulated, utilizing the entire content of the target incompatible-instruction data address register as a target system virtual address for accessing the operand data in a target system memory, and translating the target system virtual address to locate the operand data in the target system memory from which the operand data is copied to the target processor for use by the target routine in completing execution of the incompatible instruction, in which the high-order section supports incompatible authority controls of the incompatible architecture in the target system even though the incompatible authority controls are transparent to the target processor.

41. An emulation method for executing an incompatible computer program on a target processor, as defined in claim 40, the emulation method further comprising again setting the low-order section of the incompatible-instruction data address register to another incompatible-instruction effective data address for another storage operand of the incompatible instruction being emulated by executing the one or more target instructions for the target routine to compute the another incompatible-instruction effective data address, utilizing the entire content of the target incompatible-instruction data address register as a target system virtual address for accessing the another operand data in the target system memory without changing the high-order section if a determination of the access authority for the another operand data finds the same access authority exists for the another operand data of the incompatible program being emulated, and translating the target system virtual address to locate another operand data in the target system memory from which the another operand data is copied to the target processor for use by the target routine in completing execution of the incompatible instruction when the incompatible instruction has more than one storage operand.

42. An emulation method for executing an incompatible computer program on a target processor, as defined in claim 41, the emulation method further comprising sizing the target-processor register used as an incompatible-instruction data address register as containing a number of bits at least equal to the number of bits in each target processor virtual address, and determining an address section of the incompatible-instruction data address register as having a number of bit positions at least equal to the size of each target processor effective data address, and an access authority section having up to the remaining bit positions in the target processor virtual address not used by the address section.

43. An emulation method for executing an incompatible computer program on a target processor, as defined in claim 38, the emulation method further comprising checking the access authority value in the high-order section of the incompatible-instruction data address register during execution of an incompatible program to determine if the access authority value is the value required to make the data access to the requested incompatible operand data.

44. An emulation method for executing an incompatible computer program on a target processor, as defined in claim 7, the preprocessing in the emulation method further comprising including preprocessing instructions in any target routine for emulating an incompatible instruction preprocessing instruction for which any preprocessing instruction is: 1) for modifying a target instruction in the target routine prior to emulation execution of the target instruction, or 2) for contolling a target system virtual address for accessing another incompatible instruction as data in the target system storage.

45. An emulation method for executing an incompatible computer program on a target processor, as defined in claim 44, the preprocessing in the emulation method further comprising executing each preprocessing instruction by microcoded software in the target system for use by each target processor in the system which is to perform preprocessing of target routines used for emulating the incompatible instructions in an incompatible program, and protecting the microcoded software from accessing by operating-system software or by application software executing on any processor in the target system.

46. An emulation method for executing an incompatible computer program on a target processor, as defined in claim 44, the preprocessing in the emulation method further comprising executing each preprocessing instruction by a microcoded software routine for simulating the function of the preprocessing instruction, structuring the macrocoded software routine from target processor instructions available in current target system architecture, and locating the macrocoded software routine in the target system storage.

47. An emulation method for executing an incompatible computer program on a target processor, as defined in claim 44, the preprocessing in the emulation method further comprising including as preprocessing instructions: any patching instruction in a target routine, and any address-changing instruction in a target routine for changing a data address to be used for accessing a next incompatible instruction, or for changing any address component in the data address whether the data address is a target real address, a target absolute address, or a target virtual address, and whether the address change is in an address component of the data address which is an authority authorization value, and address space identifier value, or an address value within an address space.

* * * * *